United States Patent
Qian

(10) Patent No.: US 10,262,386 B2
(45) Date of Patent: Apr. 16, 2019

(54) METHOD, APPARATUS AND SYSTEM FOR RENDERING REGIONS OF AN IMAGE

(71) Applicant: CANON KABUSHIKI KAISHA, Tokyo (JP)

(72) Inventor: Lena Qunying Ye Qian, Artarmon (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/070,996

(22) Filed: Mar. 15, 2016

(65) Prior Publication Data

US 2016/0275700 A1    Sep. 22, 2016

(30) Foreign Application Priority Data

Mar. 18, 2015  (AU) ................ 2015201418

(51) Int. Cl.
  *G09G 5/02* (2006.01)
  *G06T 1/20* (2006.01)
  *G06T 11/40* (2006.01)
  *G06K 15/02* (2006.01)

(52) U.S. Cl.
  CPC .............. *G06T 1/20* (2013.01); *G06T 11/40* (2013.01); *G06K 15/1842* (2013.01)

(58) Field of Classification Search
  CPC ...... G06T 11/40; G06F 3/1212; G06F 3/1215; G06F 3/122; G06F 3/1248; G06F 3/1208; G06F 3/1244; G06K 15/181; G06K 15/1849; G06K 15/1842; G06K 15/1857
  See application file for complete search history.

(56) References Cited

U.S. PATENT DOCUMENTS

| | | | |
|---|---|---|---|
| 7,330,192 B2 | 2/2008 | Brunner et al. | |
| 2006/0114263 A1* | 6/2006 | Moore | G06T 15/80 345/592 |
| 2012/0105911 A1* | 5/2012 | Belbin | G06F 3/122 358/1.15 |
| 2012/0127182 A1 | 5/2012 | Narayanan et al. | |
| 2013/0258358 A1* | 10/2013 | Qian | G06K 15/1813 358/1.8 |

* cited by examiner

*Primary Examiner* — Hau H Nguyen

(74) *Attorney, Agent, or Firm* — Canon U.S.A., Inc. I.P. Division

(57) ABSTRACT

A method of rendering an image is disclosed. A plurality of non-overlapping regions of the image is received, each region being associated with a fill compositing stack comprising a plurality of levels to be composited to determine color data of said region, each level being defined by a compositing operation and a color operand. Equivalent ones of the compositing stacks are identified, the equivalent compositing stacks being defined by equivalent sets of graphical commands applied to different color operands. Regions associated with the equivalent compositing stacks are selected. Pixels corresponding to the selected regions are combined into a data structure. The pixels are concurrently rendered using the data structure to render the image.

25 Claims, 26 Drawing Sheets

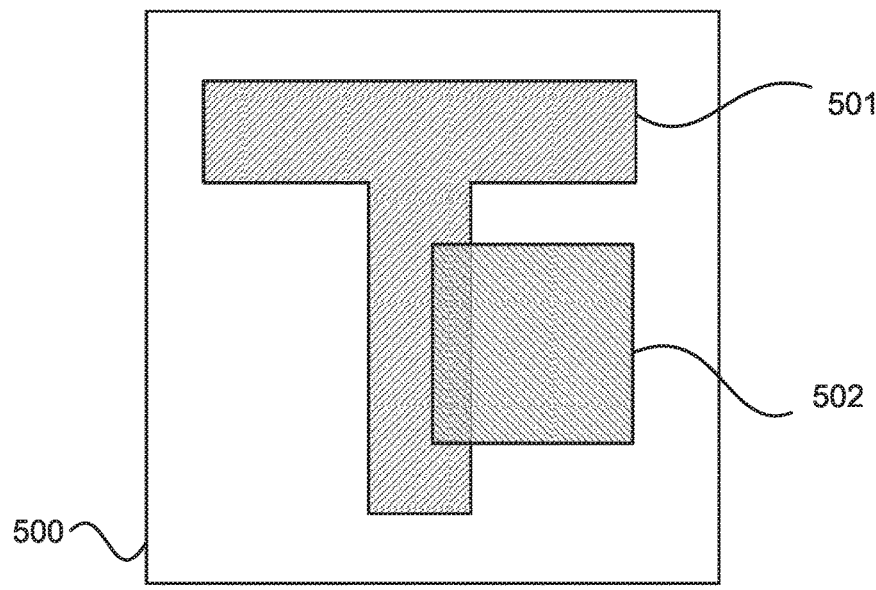
Fig. 5A
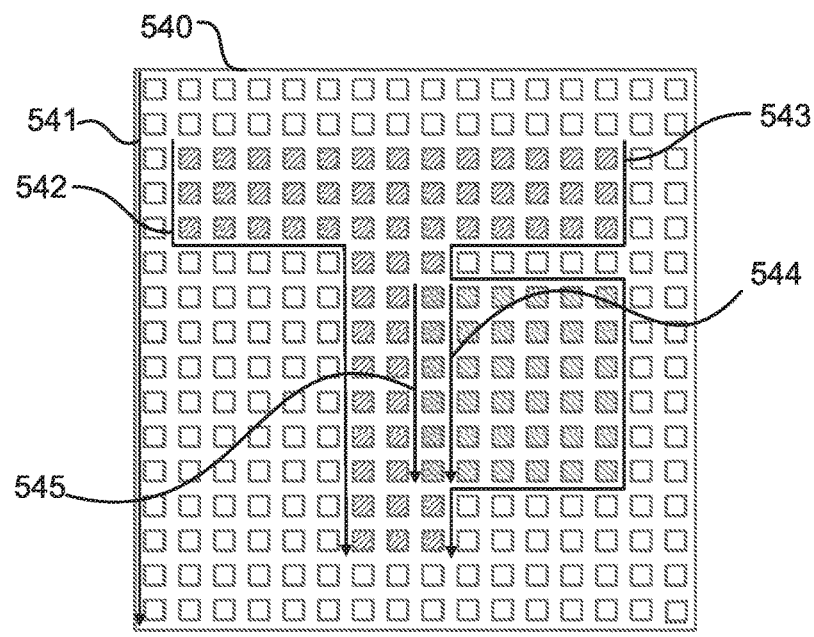
Fig. 5B
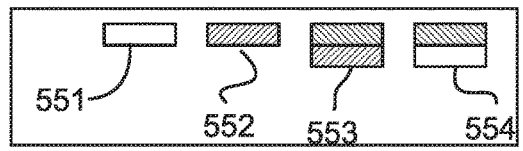

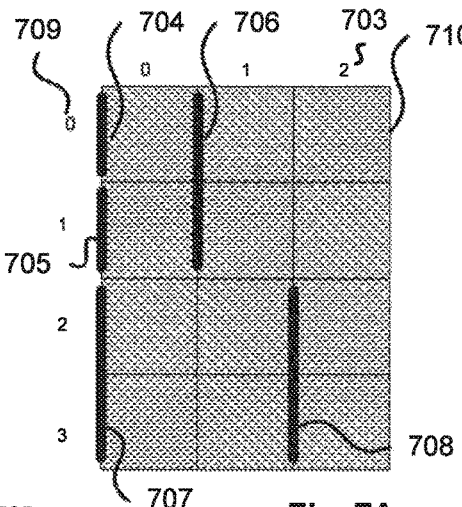

Fig. 7A

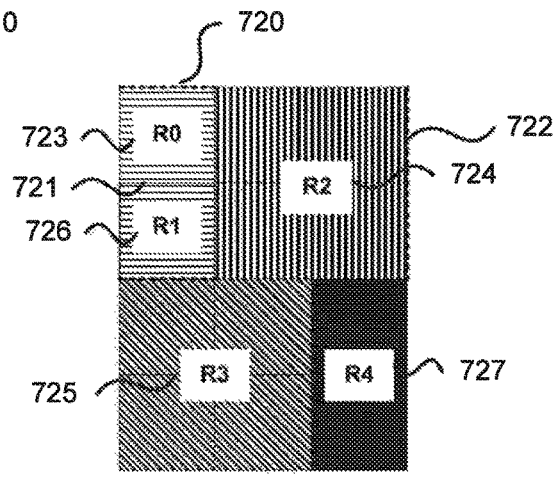

Fig. 7B

Region R0 — 765
- 750 StartY = 0
- 751 Region Height = 1
- 752 Total Pixels = 1
- 753 Stack Index = 0
- 754 InSuperRegion = False Row List — 755
0: (0, 0, 1)
756 757 758 759

Region R1 — 766
- StartY = 1
- Region Height = 1
- Total Pixels = 1
- Stack Index = 0
- InSuperRegion = False Row List
0: (0, 0, 1)

Region R2 — 767
- StartY = 0
- Region Height = 2
- Total Pixels = 4
- Stack Index = 1
- InSuperRegion = False Row List
0: (1, 0, 2)
1: (1, 2, 2)

Region R3 — 768
- StartY = 2
- Region Height = 2
- Total Pixels = 4
- Stack Index = 2
- InSuperRegion = False Row List
0: (0, 0, 2)
1: (0, 2, 2)

Region R4 — 769
- StartY = 2
- Region Height = 2
- Total Pixels = 2
- Stack Index = 3
- InSuperRegion = False Row List
0: (2, 0, 1)
1: (2, 1, 1)

Fig. 7C

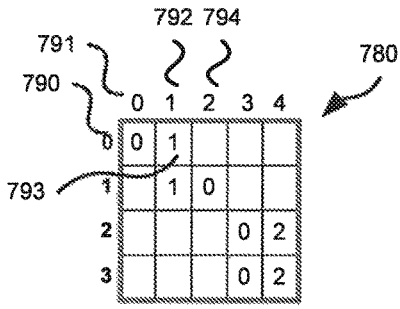

Fig. 7D

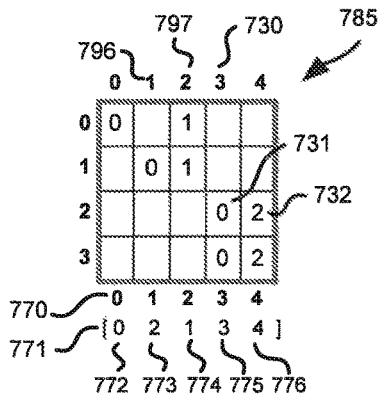

Fig. 7E

| Region Idx | RegionData |
|---|---|
| 0 | StartY = 0<br>Region Height = 1<br>Total Pixels= 1<br>Stack Index = 0<br>InSuperRegion = False |
| 1 | StartY = 1<br>Region Height = 1<br>Total Pixels= 1<br>Stack Index = 0<br>InSuperRegion = False |
| 2 | StartY = 0<br>Region Height = 2<br>Total Pixels= 4<br>Stack Index = 1<br>InSuperRegion = False |
| 3 | StartY = 2<br>Region Height = 2<br>Total Pixels= 4<br>Stack Index = 2<br>InSuperRegion = False |
| 4 | StartY = 2<br>Region Height = 2<br>Total Pixels= 2<br>Stack Index = 3<br>InSuperRegion = False |

Fig. 9A

METHOD, APPARATUS AND SYSTEM FOR RENDERING REGIONS OF AN IMAGE

REFERENCE TO RELATED PATENT APPLICATION

This application claims the benefit under 35 U.S.C. § 119 of the filing date of Australian Patent Application No. 2015201418, filed Mar. 18, 2015, hereby incorporated by reference in its entirety as if fully set forth herein.

TECHNICAL FIELD

The present invention relates generally to the field of graphics rendering and, in particular, to a method, apparatus and system for rendering an image. The present invention also relates to a computer program product including a computer readable medium having recorded thereon a computer program for rendering an image.

BACKGROUND

Processing performance speedup can be achieved through the use of multi-processor architectures in computer systems, including printing systems. Such architectures allow a number of computation threads belonging to one or more processes to execute in parallel across a number of cores or processors, thereby reducing overall execution time.

Print data may be subdivided into a number of regions. The regions may be processed independently in parallel on central processing units (CPUs) and graphics processing units (GPUs). GPUs provide large numbers of parallel processors, allowing a large number of pixels to be processed in parallel.

Print data can also be pre-processed into an intermediate region-based graphical representation which is intermediate between a page description format and a bitmap format, such as a fillmap. The pre-processing of the print data may be done to compress the print data and use less memory, to transfer the print data across a network, or to enable printing of the print data in real time. The intermediate data may be rendered during printing. There are other intermediate region-based representations, such as a planar map, which are often formed using a series of non-overlapping regions.

Just as in regional pixel processing, the regions in the intermediate representation may be rendered in serial, one pixel location at a time, in one region at a time. However, it is usually more efficient to render the regions in parallel (i.e., pixel and region), for instance on GPUs. GPU computing efficiency and throughput is compromised if certain conditions are not met in programming the GPU.

SUMMARY

It is an object of the present invention to substantially overcome, or at least ameliorate, one or more disadvantages of existing arrangements.

Disclosed are arrangements which seek to address the above problems by efficiently grouping pixels into larger regions than the regions that result from grouping identical compositing stacks. The larger regions may be referred to as "super regions". The super regions group pixels that share the same compositing operations, but not necessarily the same operands for the compositing operations. The larger regions are less prone to low rendering efficiency caused by excessive kernel overheads and small data transfers.

According to one aspect of the present disclosure, there is provided a method of rendering an image, the method comprising:

receiving a plurality of non-overlapping regions of the image, each region being associated with a fill compositing stack comprising a plurality of levels to be composited to determine colour data of said region, each level being defined by a compositing operation and a colour operand;

identifying equivalent ones of said compositing stacks, the equivalent compositing stacks being defined by equivalent sets of graphical commands applied to different colour operands;

selecting regions associated with the equivalent compositing stacks;

combining pixels corresponding to the selected regions into a data structure; and rendering pixels concurrently using the data structure to render the image.

According to another aspect of the present disclosure, there is provided a system for rendering an image, the system comprising:

a memory for storing data and a computer program;

a processor coupled to the memory for executing the computer program, the computer program comprising instructions for:

receiving a plurality of non-overlapping regions of the image, each region being associated with a fill compositing stack comprising a plurality of levels to be composited to determine colour data of said region, each level being defined by a compositing operation and a colour operand;

identifying equivalent ones of said compositing stacks, the equivalent compositing stacks being defined by equivalent sets of graphical commands applied to different colour operands;

selecting regions associated with the equivalent compositing stacks;

combining pixels corresponding to the selected regions into a data structure; and rendering pixels concurrently using the data structure to render the image.

According to still another aspect of the present disclosure, there is provided an apparatus for rendering an image, the apparatus comprising:

means for receiving a plurality of non-overlapping regions of the image, each region being associated with a fill compositing stack comprising a plurality of levels to be composited to determine colour data of said region, each level being defined by a compositing operation and a colour operand;

means for identifying equivalent ones of said compositing stacks, the equivalent compositing stacks being defined by equivalent sets of graphical commands applied to different colour operands;

means for selecting regions associated with the equivalent compositing stacks;

means for combining pixels corresponding to the selected regions into a data structure; and means for rendering pixels concurrently using the data structure to render the image.

According to still another aspect of the present disclosure, there is provided a computer readable medium having a computer program recorded thereon for rendering an image, the program comprising:

code for receiving a plurality of non-overlapping regions of the image, each region being associated with a fill compositing stack comprising a plurality of levels to be composited to determine colour data of said region, each level being defined by a compositing operation and a colour operand;

code for identifying equivalent ones of said compositing stacks, the equivalent compositing stacks being defined by equivalent sets of graphical commands applied to different colour operands;

code for selecting regions associated with the equivalent compositing stacks;

code for combining pixels corresponding to the selected regions into a data structure; and code for rendering pixels concurrently using the data structure to render the image.

According to still another aspect of the present disclosure, there is provided a method of rendering an image using a graphics processing unit, the method comprising:

receiving a plurality of regions, each region being associated with a stack of colour generation operations;

identifying equivalent stacks of colour generation operations including equivalent sets of graphical commands applied to different colour data;

grouping regions associated with the identified equivalent stacks of colour generation operations to be rendered in parallel by a graphics processing kernel launched on the graphics processing unit to process the grouped regions; and rendering pixels corresponding to the grouped regions by parallel threads of the graphics processing unit, the threads executing instructions defined by the graphics processing kernel.

According to still another aspect of the present disclosure, there is provided a system for rendering an image, the system comprising:

a memory for storing data and a computer program;

a processor coupled to the memory for executing the computer program, the computer program comprising instructions for:

receiving a plurality of non-overlapping regions, each region being associated with a stack of colour generation operations;

identifying equivalent stacks of colour generation operations including equivalent sets of graphical commands applied to different colour data; and grouping regions associated with the identified equivalent stacks of colour generation operations to be rendered in parallel by a graphics processing kernel launched on a graphics processing unit to process the grouped regions, wherein pixels corresponding to the grouped regions are rendered using parallel threads of the graphics processing unit, the threads executing instructions defined by the graphics processing kernel.

According to still another aspect of the present disclosure, there is provided an apparatus for rendering an image using a graphics processing unit, the apparatus comprising:

means for receiving a plurality of regions, each region being associated with a stack of colour generation operations;

means for identifying equivalent stacks of colour generation operations including equivalent sets of graphical commands applied to different colour data;

means for grouping regions associated with the identified equivalent stacks of colour generation operations to be rendered in parallel by a graphics processing kernel launched on the graphics processing unit to process the grouped regions; and means for rendering pixels corresponding to the grouped regions by parallel threads of the graphics processing unit, the threads executing instructions defined by the graphics processing kernel.

According to still another aspect of the present disclosure, there is provided a computer readable medium having a computer program stored thereon for rendering an image using a graphics processing unit, the program comprising:

code for receiving a plurality of regions, each region being associated with a stack of colour generation operations;

code for identifying equivalent stacks of colour generation operations including equivalent sets of graphical commands applied to different colour data;

code for grouping regions associated with the identified equivalent stacks of colour generation operations to be rendered in parallel by a graphics processing kernel launched on the graphics processing unit to process the grouped regions; and code for rendering pixels corresponding to the grouped regions by parallel threads of the graphics processing unit, the threads executing instructions defined by the graphics processing kernel.

According to still another aspect of the present disclosure, there is provided a method of rendering an image, the method comprising:

receiving a plurality of non-overlapping regions of the image, each region being associated with a fill compositing stack comprising a plurality of levels to be composited to determine colour data of said region, each level being defined by a compositing operation and an operand;

identifying equivalent ones of said compositing stacks, the equivalent compositing stacks being defined by equivalent sets of graphical commands applied to different operands;

selecting regions associated with the equivalent compositing stacks;

combining pixels corresponding to the selected regions into a data structure; and rendering pixels concurrently using the data structure to render the image.

Other aspects of the invention are also disclosed.

BRIEF DESCRIPTION OF THE DRAWINGS

One or more embodiments of the invention will now be described with reference to the following drawings, in which:

FIG. 5A shows an exemplary page with graphic objects;

FIG. 5B shows a fillmap representation of the page of FIG. 5A;

FIG. 7A shows an example of a fillmap tile;

FIG. 7B shows an example of regions within a fillmap tile;

FIG. 7C shows examples of region data structures;

FIG. 7D shows an example of an edge matrix;

FIG. 7E shows an example of a sorted edge matrix;

FIG. 9A shows an example of a list of region data structures within a fillmap tile;

DETAILED DESCRIPTION INCLUDING BEST MODE

Figure 1:
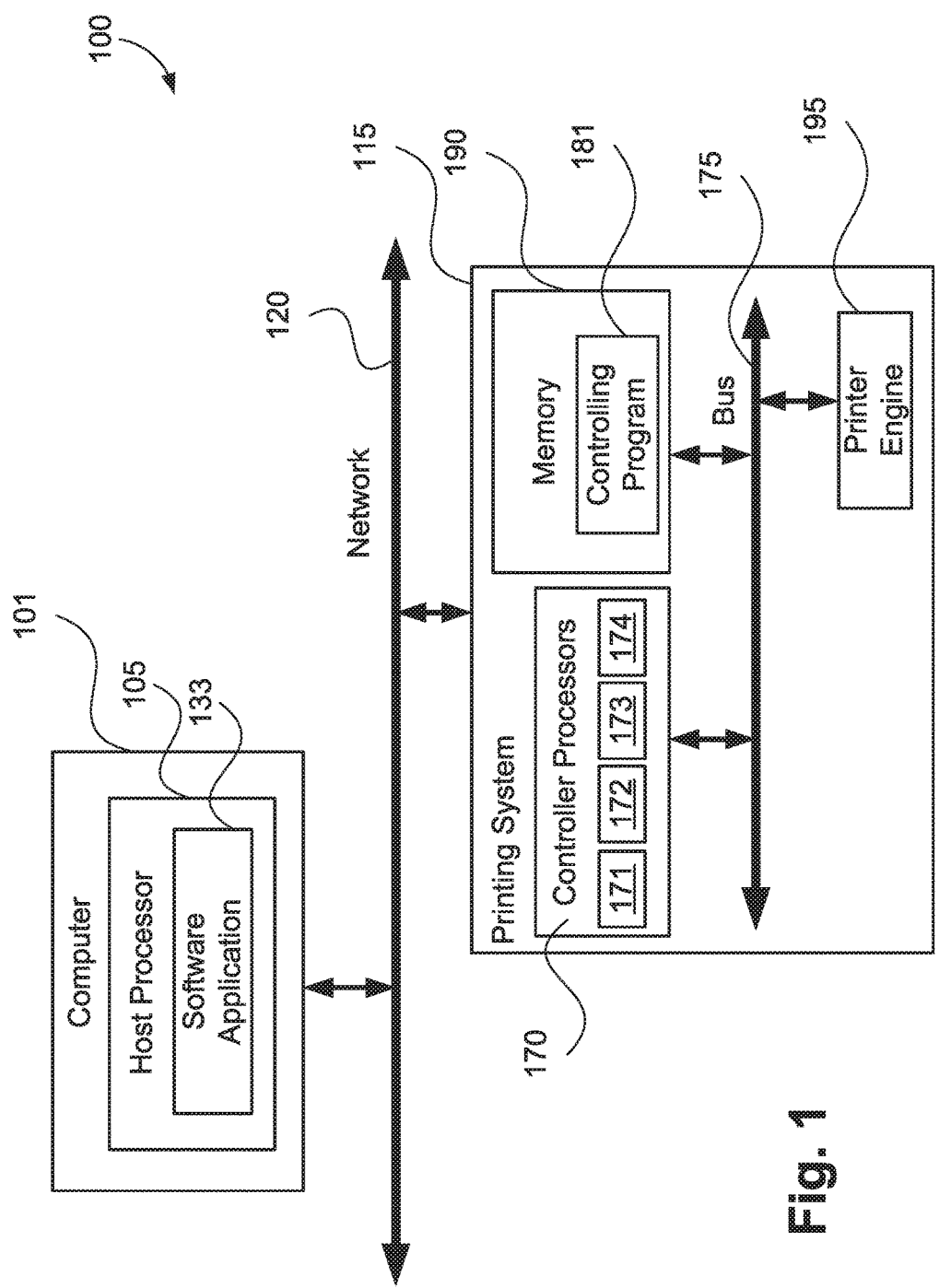
FIG. 1 is a schematic block diagram of a multi-processor printing system for rendering graphic objects.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which may form public knowledge through their respective publication and/or use. Such discussions should not be interpreted as a representation by the present inventor(s) or the patent applicant that such documents or devices in any way form part of the common general knowledge in the art.

GPUs organise processing threads into 'warps' or 'wavefronts', according to hardware. Within the warps, threads follow the same sequences of instruction execution, which is known as minimising divergence.

Both the quantity and size of GPU kernels launched need to be carefully managed to maximise efficiency. If many tiny kernels are launched, each processing just a small number of pixels, then excessive cumulative launch overhead can result, compromising efficiency.

Programs using a GPU must minimise data transfer times between a host CPU and the GPU, as excessive transfer times can reduce the overall efficiency of the processing, especially when the GPU is on a discrete peripheral component interconnect (PCI) card.

Processing each region of an intermediate region-based representation by a GPU kernel associated with the region, may result in minimal instruction divergence within warps. However, such processing can create a large number of kernels when rendering complex source images with large numbers of different compositing stacks, resulting in high kernel launch overheads. Further, the data transfers resulting from such processing would be frequent and of small size, and unlikely to use the available bus bandwidth. Performance may be badly compromised under such conditions.

FIG. 1 shows a schematic block diagram of a pixel rendering system 100 for rendering graphic objects. The pixel rendering system 100 comprises a computer module 101 connected to a printer system 115 through a communications network 120. The network 120 may be a wide-area network (WAN), such as the Internet, a cellular telecommunications network, or a private WAN. The network 120 may comprise multiple computers. Alternatively, the network 120 may be a single computer module 101 and a printing system (e.g., 115). Alternatively, the computer 101 and printing system 115 may be connected by a cable used to communicate between devices, such as a USB, serial, parallel or FireWire cable.

The computer module 101 comprises at least one host processor 105 for executing a software application 133, such as a word processor or graphical software application.

The printing system 115 comprises plurality of controller processors 170. As shown in FIG. 1, the controller processors 170 comprise four processors 171, 172, 173 and 174, for executing one or more software code modules forming a controlling program 181 which is stored in a memory 190. Alternatively, the controller processors 170 may comprise processors that take the form of single-core central processing units (CPUs), GPUs, or any other form of computer processor such as field-programmable gate arrays (FPGAs). In another alternative, the controller processors 170 may comprise a mixture of the various kinds of processors described above. In one implementation of the printing system 115, one of the processors 171-174 is a GPU processor.

The printing system 115 also comprises a printer engine 195 coupled to the controller processors 170, via an interconnected bus 175. The controlling program 181 accepts a printable page 201 produced by a software application 133 and produces pixel data values 206 for printing. The pixel data values 206 may then be stored in memory 190 and reproduced as pixels by the printer engine 195, for example. The controlling program 181 may be executed by the controller processors 170 in one or more threads of execution. A thread consists of a number of instructions or steps that are executed in sequence by one of the processors 171-174. The controlling program 181 will be further described in detail below with reference to FIG. 2.

Figure 3A:
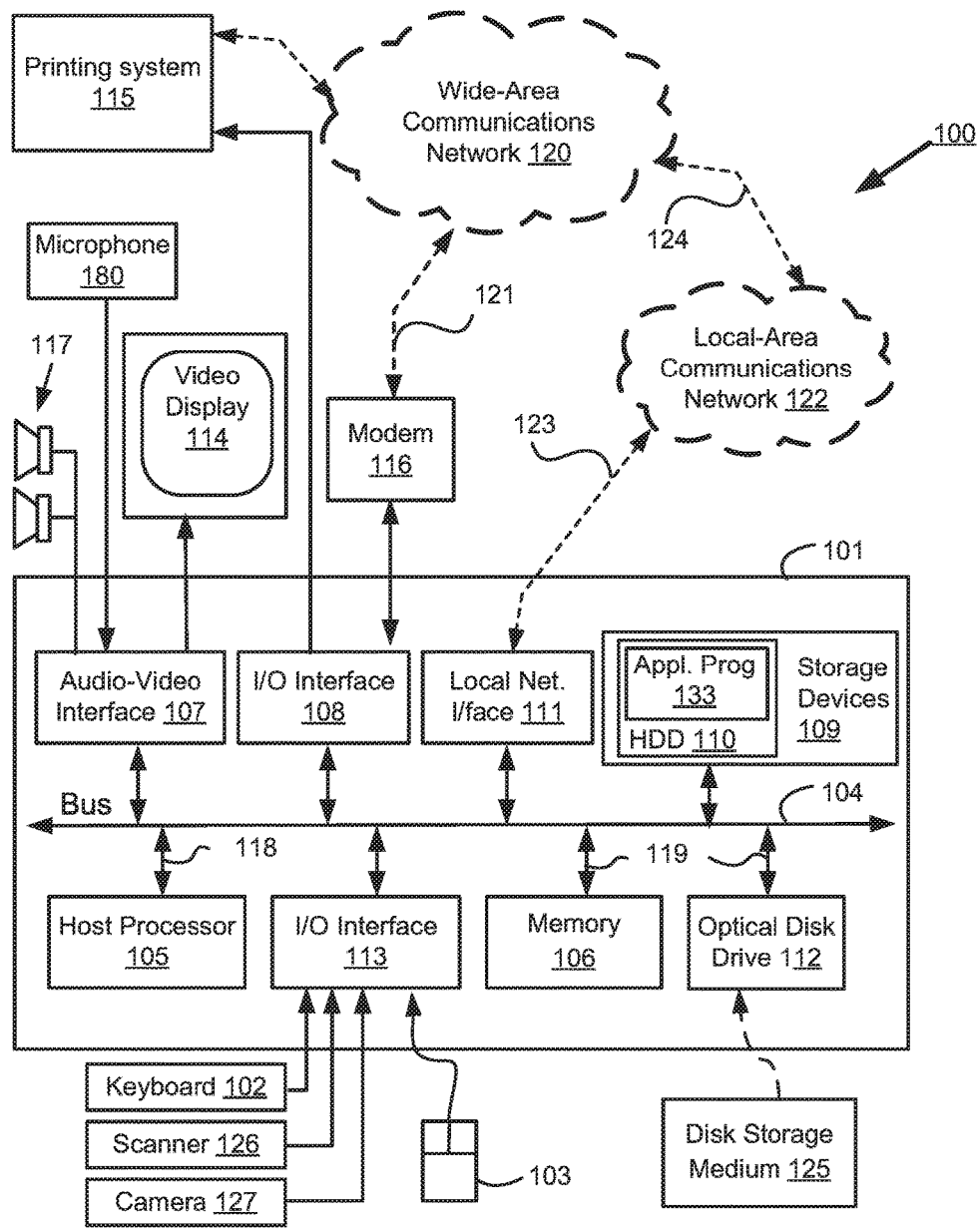
FIGS. 3A and 3B collectively form a schematic block diagram of a general purpose computer system upon which various arrangements described can be practiced.

As seen in more detail in FIG. 3A, the pixel rendering system 100 includes: the computer module 101; input devices such as a keyboard 102, a mouse pointer device 103, a scanner 126, a camera 127, and a microphone 180; and output devices including the printing system 115, a display device 114 and loudspeakers 117. An external Modulator-Demodulator (Modem) transceiver device 116 may be used by the computer module 101 for communicating to and from the communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes the at least one processor unit 105, and a memory unit 106. For example, the memory unit 106 may have semiconductor random access memory (RAM) and semiconductor read only memory (ROM). The computer module 101 also includes a number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and the printing system 115. In some implementations, the modem 116 may be incorporated within the computer module 101, for example, within the interface 108. The computer module 101 also has a local network interface 111, which permits coupling of the computer module 101 via a connection 123 to a local-area communications network 122, known as a Local Area Network (LAN). As illustrated in FIG. 3A, the local communications network 122 may also couple to the wide network 120 via a connection 124, which would typically include a so-called "firewall" device or device of similar functionality. The local network interface 111 may comprise an Ethernet™ circuit card, a Bluetooth™ wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or alike computer systems.

Methods described below may be implemented using the system 100 wherein one or more steps of the processes of FIGS. 2, 4, 6, 10, 11, 12, 13, 14, 15, 16, 18 and 19, to be described, may be implemented as one or more code modules of the software application program 133 executable within the system 100. One or more of the steps of the described methods may be effected by instructions 131 (see FIG. 3B) in the software 133 that are carried out within the system 100. The described methods may be performed by the processors 170 of which one may be a GPU processor 301. The described methods can partially be performed by the host processor 105.

As also described below, one or more steps of the processes of FIGS. 2, 4, 6, 10, 11, 12, 13, 14, 15, 16, 18 and 19, to be described, may be implemented as one or more of the code modules forming the controlling program 181 executable within the printing system 115. Again, one or more of the steps of the described methods may be affected by instructions, similar to the instructions 131 in the software 133.

The software instructions implementing the software application program and/or the controlling program may be formed as the one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 133 is typically stored in the HDD 110 or the memory 106. The software is loaded into the system 100 from the computer readable medium, and then executed by the system 100. A computer readable medium having such software or computer program recorded on the computer readable medium is a computer program product. The use of the computer program product in the system 100 preferably effects an advantageous apparatus for implementing the described methods.

In some instances, the application programs 133 and/or the controlling program 181 may be supplied to the user encoded on one or more CD-ROMs 125 and read via the corresponding drive 112, or alternatively may be read by the user from the networks 120 or 122. Still further, the software can also be loaded into the system 100 from other computer readable media. Computer readable storage media refers to any non-transitory tangible storage medium that provides recorded instructions and/or data to the system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the software application program and/or the controlling program and the corresponding code modules mentioned above may be executed to implement one or more graphical user interfaces (GUIs) to be rendered or otherwise represented upon the display 114. Through manipulation of typically the keyboard 102 and the mouse 103, a user of the system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

Figure 3B:
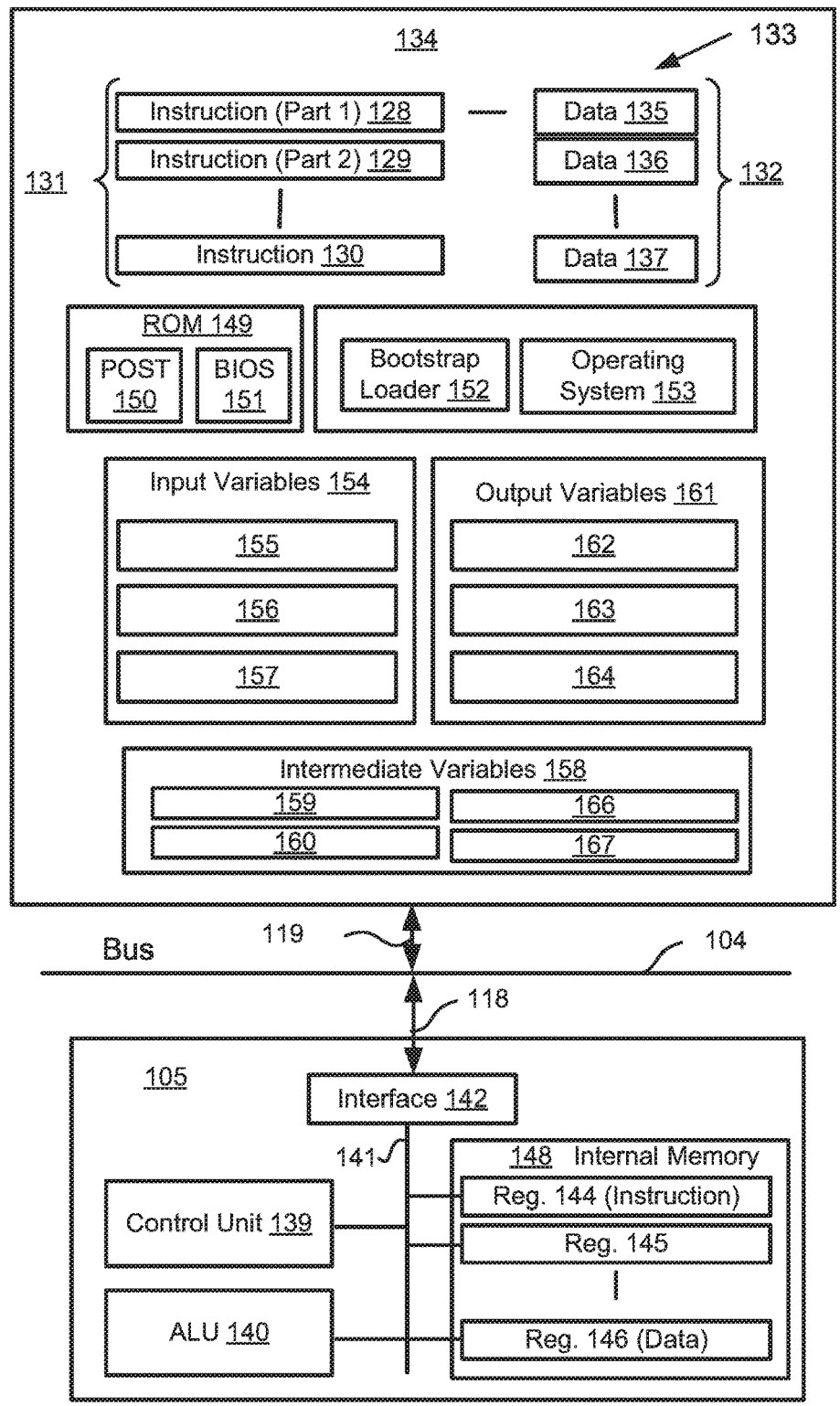

FIG. 3B is a detailed schematic block diagram of the processor 105 and a "memory" 134. The memory 134 represents a logical aggregation of all the memory modules (including the HDD 110 and semiconductor memory 106) that can be accessed by the computer module 101 in FIG. 3A.

When the computer module 101 is initially powered up, a power-on self-test (POST) program 150 executes. The POST program 150 is typically stored in a ROM 149 of the semiconductor memory 106 of FIG. 3A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 3A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 3A need to be used properly so that each process can run effectively. Accordingly, the aggregated memory 134 is not intended to illustrate how particular segments of memory are allocated (unless otherwise stated), but rather to provide a general view of the memory accessible by the system 100 and how such is used.

As shown in FIG. 3B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 122, data retrieved from one of the storage devices 106, 109 or data retrieved from a storage medium 125 inserted into the corresponding reader 112, all depicted in FIG. 3A. The execution of a set of the instructions may in some cases result in output of data. Execution may also involve storing data or variables to the memory 134.

The methods described below may use input variables 154, which are stored in the memory 134 in corresponding memory locations 155, 156, 157. The disclosed methods produce output variables 161, which are stored in the memory 134 in corresponding memory locations 162, 163, 164. Intermediate variables 158 may be stored in memory locations 159, 160, 166 and 167.

Referring to the processor 105 of FIG. 3B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

a) a fetch operation, which fetches or reads an instruction 131 from a memory location 128, 129, 130;

b) a decode operation in which the control unit 139 determines which instruction has been fetched; and c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

One or more steps or sub-processes in the processes of FIGS. 2, 4, 6, 10-16, 18 and 19 may be associated with one or more segments of the program 133 and is performed by the register section 144, 145, 146, the ALU 140, and the control unit 139 in the processor 105 working together to perform the fetch, decode, and execute cycles for every instruction in the instruction set for the noted segments of the program 133.

As described above, one or more steps of the processes of FIGS. 2, 4, 6, 10-16, 18 and 19, to be described, may be implemented as one or more code modules of the controlling program 181 executable within the printing system 115. The code modules forming the controlling program 181 are typically stored in the memory 190. The code modules forming the controlling program 181 may be loaded into the printing system 115 from the computer readable medium, and then executed by the printing system 115. A computer readable medium having such software or computer program recorded on the computer readable medium is a computer program product. The use of the computer program product in the printing system 115 preferably effects an advantageous apparatus for implementing one or more steps of the described methods.

In some instances, the controlling program 181 may be supplied to the user encoded on one or more CD-ROMs, similar to the CD-ROMs 125, or alternatively may be read by the user from the networks 120 or 122. Still further, software code modules for the controlling program 181 may also be loaded into the system 100 from other computer readable media.

The code modules implementing the controlling program 181 may be executed by the controller processors 170 in a similar manner to the code modules implementing the software application program 133 as described above.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

Figure 2:
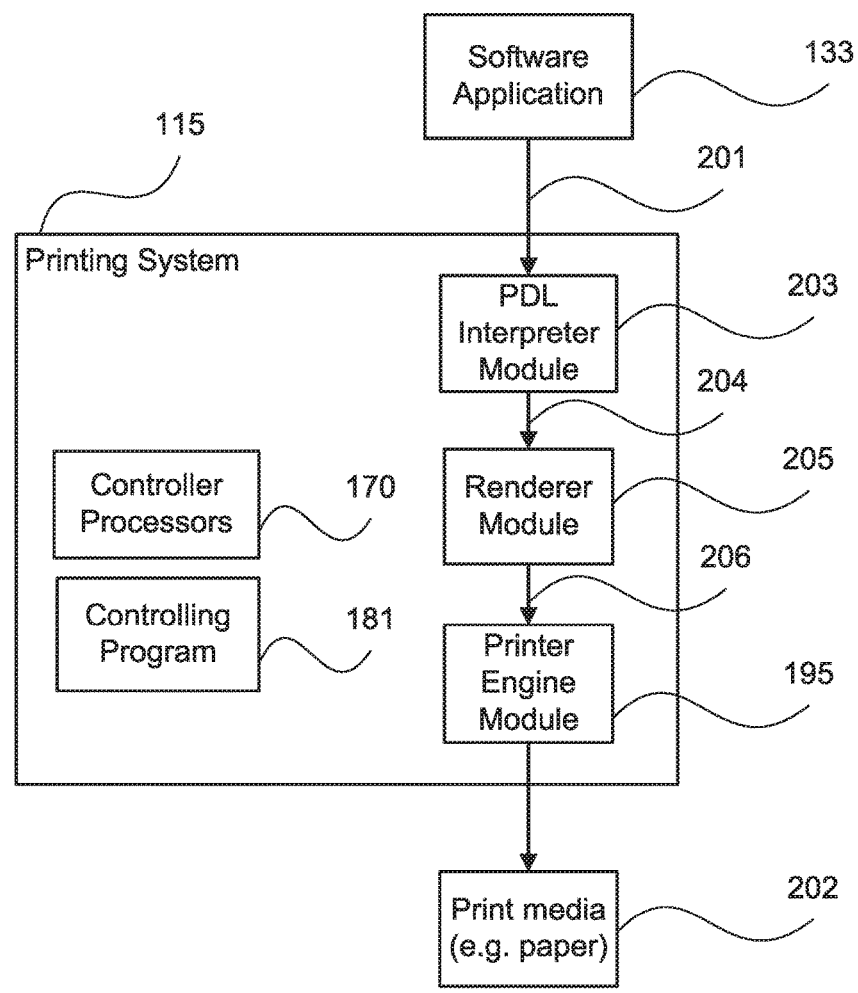
FIG. 2 is an example of a software architecture for the printing system of FIG. 1.

FIG. 2 shows a software architecture for printing a printable page 201 using the system 100. Each of the modules 203 and 205 described below may be formed by one or more of the code modules of the controlling program 181 and/or the software application 133.

The software application 133, for example, executing on the computer module 101, provides the printable page 201 to the printing system 115 for printing to a print media 202, such as a paper sheet. The printable page 201 is typically provided in the form of a description of the printable page 201, the description being specified using a Page Description Language (PDL), such as Adobe® PDF or Hewlett-Packard® PCL. The PDL provides descriptions of graphic objects to be rendered onto the print media 202 in a rendering (or z) order, as opposed to a raster image (i.e., a bitmap of pixel values) of the page to be printed. The printable page 201 may be the whole or part of a print job created by the software application 133 executing in the computer module 101.

A PDL interpreter module 203 receives the printable page 201 and generates graphic objects 204 to be printed. The printing system 115 then uses a renderer module 205 to render the graphic objects 204 to pixel data values 206. The pixel data values 206 are printed to the print media 202, such as paper, using a printer engine module 195. The printer engine module 195 may, for example, be an electro-photographic engine.

The PDL interpreter module 203 and renderer module 205 may be implemented as one or more code modules of the controlling program 181 which is executed by the controller processors 170 within the printing system 115. The renderer module 205 will be described in more detail later with reference to FIG. 4.

Operation of the printing system 115 is similar to that of the computer module 101 in terms of storage and execution of the controlling program 181 by the memory 190 and the controller processors 170, respectively. However, the controlling program 181 is typically multi-threaded with distinct program threads executing on corresponding ones of the multiple processors 171-174 making up the controller processors 170. As such, the foregoing description of the computer module 101 is generally applicable to the printing system 115. Specifically, the controlling program 181 is typically stored on a memory drive (not illustrated) which may be a hard disk drive or semiconductor hard drive. Further, the controlling program 181 may be loaded via an interface connection (e.g., a USB port) or via the network 120.

Figure 3C:
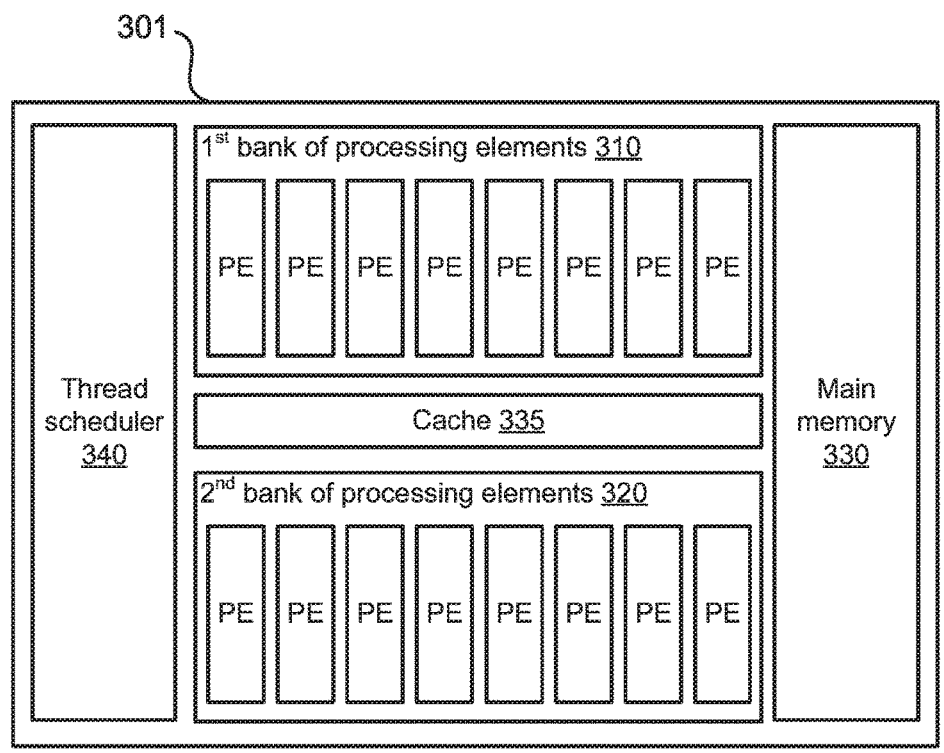
FIG. 3C is a schematic block diagram of a GPU processor upon which various arrangements described can be practiced.

As described above, the controller processors 170 can take many different forms, including single-core CPUs and GPUs. A schematic block diagram of a central processing unit (CPU) was described previously with reference to FIG. 3B. A schematic block diagram of a GPU 301 will now be described with reference to FIG. 3C. A GPU comprises various processing elements. The example GPU 301 contains two banks of processing elements 310 and 320. Each processing element (PE) is capable of executing many threads of execution in parallel using one or more SIMD (single instruction multiple data) arrays. A processing element may also contain a small amount of fast cache memory and a scheduler for deciding which threads to execute at any given point in time. A higher-level thread scheduler 340 allocates blocks of threads to individual processing elements. Another level of cache memory 335 is typically provided between the processing elements 310 and 320, and main memory 330. Main memory 330 may be a subset of the memory 190 of the printing system 115, or may be entirely separate memory that is considered part of the GPU. The main memory 330 is typically large and slow to access. Many variations in GPU architecture exist, but most architectures share the general components shown in FIG. 3C.

Returning to FIG. 1, in the pixel rendering system 100, the software application 133 creates printable pages for printing, such as printable page 201. The printable page 201 often contains graphic objects such as text, lines, fill regions, and image data. The software application 133 sends a high-level description of the printable page 201 (e.g., a PDL file) via the network 120 to the controlling program 181 that is executed by the controller processors 170 of the printing system 115. The printable page 201 contains all information required by the printing system 115 to render and print the page.

Alternatively, the printing system 115, the controller processors 170 and controlling program 181, may be resident in separate servers connected to the network 120, such as the computer system 101. In another alternative, the printing system 115, the controller processors 170 and controlling program 181 may be resident in a distributed network of servers. In arrangements where the printing system 115, the controller processors 170 and controlling program 181 are resident in separate servers or in a distributed network of servers, the raster image representation produced by the controlling program 181 is sent to the printer engine module 195 via a network rather than the bus 175.

The described methods may also be implemented as part of other graphics rendering systems in which an intermediate representation is rendered (e.g., for displaying PDF documents on an LCD display). As such, the described methods are not limited to printing systems.

Figure 4:
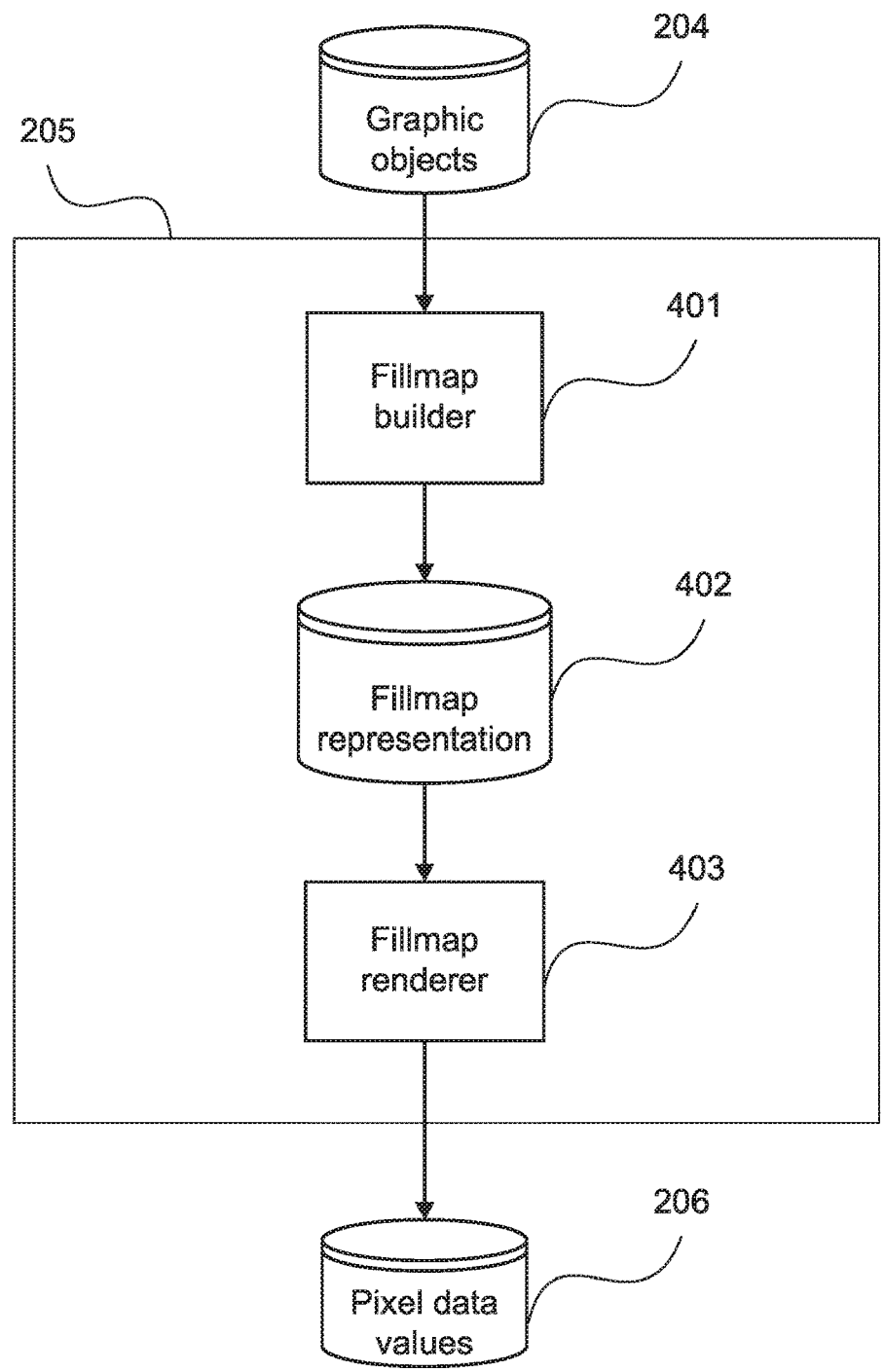
FIG. 4 is a schematic block diagram of a renderer module upon which various arrangements described can be practiced.

The renderer module 205 will now be described in more detail with reference to FIG. 4. The renderer module 205 comprises fillmap builder module 401 and a fillmap rendered module 403. The fillmap builder module 401 and the fillmap renderer module 403 may be formed by one or more of the code modules of the controlling program 181 and/or the software application 133. The renderer module 205 contains or otherwise implements one implementation of rendering graphic objects 204 to pixel data values 206 according to the disclosed arrangements.

As described above with reference to FIG. 2, the renderer module 205 receives graphic objects 204. The fillmap builder 401 receives the graphic objects 204 in an order known as z-order. The fillmap builder 401 converts the graphic objects 204 into an intermediate representation. In one arrangement, the intermediate print data representation is a fillmap representation 402, which is a pixel-aligned region-based representation. The process executed by the fillmap builder 401 will be described in more detail below with reference to FIG. 5A and FIG. 5B. The fillmap renderer 403 receives the fillmap representation 402 and renders the fillmap representation 204 to pixel data values 206. The rendering process executed by the fillmap renderer 403 will be described in more detail below with reference to FIG. 6.

As described above with reference to FIG. 2, the controlling program 181, and therefore the renderer component 205, is executed by the controller processors 170. The fillmap builder 401 and fillmap renderer 403 may utilise any suitable multi-threading method to reduce the time spent processing the graphic objects 204.

FIG. 5B shows a fillmap representation 540 of a page 500 represented in FIG. 5A.

A fillmap representation of a graphical image such as a page will now be described in more detail. A fillmap is a region-based representation of a graphical image such as a page. The fillmap maps a region of pixels within the page to a fill compositing sequence (or a fill compositing stack) which will be composited to generate the colour data for each pixel within that fillmap region. Multiple fillmap regions within a fillmap can map to the same fill compositing sequence. Fillmap regions within the fillmap do not overlap and therefore each pixel in the rendered page only belongs to a single fillmap region. Each fillmap region within the fillmap is defined by a set of pixel-aligned fillmap edges which activate the fill compositing sequence associated with that fillmap region. Pixel-aligned fillmap edges:

(i) are monotonically increasing in the y-direction of the page;

(ii) do not intersect each other;

(iii) are aligned with pixel boundaries, meaning that each pixel-aligned fillmap edge consists of a sequence of segments, each of which follows a boundary between two contiguous pixels;

(iv) contain a reference to the fill sequence required to be composited to render to pixels the fillmap region to which the pixel-aligned fillmap edge belongs; and (v) activate pixels within a single fillmap region.

In one arrangement, references to fill compositing sequences are indices into a table of fill compositing sequences.

On any given scan line, starting at a pixel-aligned fillmap edge which activates a fillmap region, and progressing in the direction of increasing x, the fillmap region remains active until a second pixel-aligned fillmap edge which activates a further fillmap region is encountered. When the second pixel-aligned fillmap edge is encountered, the active fillmap region is deactivated, and the fillmap region corresponding to the second pixel-aligned fillmap edge is activated.

Within a fillmap, the fill compositing sequence active within each fillmap region of pixels is stored in the table of fill compositing sequences. A fill compositing sequence is a sequence of z-ordered levels, where each level contains attributes such as a fill, the opacity of the level, a compositing operation which determines how to mix the colour data of this level with other overlapping levels, and the priority, or z-order, of the level. A fill compositing sequence contains references to all the levels which contribute colour to the pixels within a fillmap region. The table of fill compositing sequences contains all of the fill compositing sequences required to render the page to pixels. In one arrangement, the table of fill compositing sequences does not contain duplicate instances of identical fill compositing sequences. Hence, multiple fillmap regions within a fillmap having the same fill compositing sequence map to the same instance of the fill compositing sequence within the table of fill compositing sequences.

The fillmap representation 540 is composed of five pixel-aligned fillmap edges, hereafter referred to as "edges" or "fillmap edges". Each particular edge references a fill compositing stack which may be used to determine colour of each of the pixels activated by the particular edge.

A fill compositing stack comprises one or more levels corresponding to objects active at a particular position on a page, each level has a compositing operation together with an operand defined by an operand type and some number of operand parameters. The compositing operation determines how each level composites with the levels below, for example, using Porter-Duff equations. Operand types include, for example, 'flat colour', 'image' (e.g. in uncompressed bitmap format), radial blend, two-point blend, three-point blend or 'ramp' (i.e., graduation between colours). Each operand type may be further described using a number of operand parameters (e.g. 'blue' for 'flat colour' operand type, 'two (2) point blue green' for 'ramp' operand type). The operand corresponds to a fill associated with a particular level (i.e. graphical object defined by a page description language which contributes to rendering pixels activated by a particular edge). If, for example, the fill of a particular graphical object is "flat blue", the operand type in this case is "flat colour" and the operand parameter is "blue". A proposed architecture for storing fill compositing sequences (or stacks) is described below.

On any given scan line on which an edge is active, the edge activates those pixels which are immediately to the right of the edge, until the next edge or a page boundary is encountered. First edge 541 traces a left hand boundary of the page 500, and references a fill compositing stack 551 which contains a single opaque level which is to be filled using the background fill. Second edge 542 traces a left hand boundary of first graphic object 501, and references a fill compositing stack 552 that contains a single level which is opaque and is to be filled using a right-leaning hatched fill. Third edge 543 references the same fill compositing stack 551 as the first edge 541. Fourth edge 544 traces a left hand boundary of a region where second object 502 overlaps a white background. The fourth edge 544 references a fill compositing stack 554 which contains two levels. A top most level of fill compositing stack 554 is transparent and is to be filled using a left-leaning hatched fill. A bottom most level fill compositing stack 554 is opaque and is to be filled using the background fill. Fifth edge 545 traces a left hand boundary of the region where the second graphic object 502 overlaps the first graphic object 501. The fifth edge 545 references a fill compositing stack 553 which contains two levels. The top most level of fill compositing stack 553 is transparent and is to be filled using a left-leaning hatched fill. A bottom most level of fill compositing stack 553 is opaque and is to be filled using a right-leaning hatched fill.

The disclosed arrangements efficiently render region-based intermediate representations using processors 170 containing many cores, such as GPUs. The region-based intermediate representation is a partially rasterised pixel-aligned graphical representation of an input PDL document (i.e. the region based intermediate representation has a format intermediate between a page description language format and a fully rasterised format, (e.g. bitmap)).

Pixels in a region, bounded by an edge on a left of the region, use the same compositing stack comprising colour generation operations as described below. For example, compositing stack 554 is referenced by edge 544. Regions are grouped into a 'super region' based on whether compositing stacks of the regions include the same compositing operation sequence and operand types. However, the compositing stacks of regions grouped into the super region may possibly include different operand parameters such as particular colours defined by an associated fill.

The compositing stacks of the regions grouped into the super region are considered to be 'equivalent' if the compositing stacks of the regions include the same compositing operation sequence and operand types even if the compositing stacks of the regions include different operand parameters. For example, compositing stacks 810 and 815 as seen in FIG. 8B are considered to be equivalent as the compositing stacks 810 and 815 include the same compositing operation sequence albeit with different operand parameters (i.e., 'Yellow' for stack 810 and 'Green' for stack 815). Compositing stack equivalence will be described in further detail below in relation to FIGS. 8A and 8B. The grouping of non-overlapping regions associated with identified equivalent compositing stacks and the rendering of pixels corresponding to the grouped regions, will also be described in further detail below.

The described methods group equivalent non-overlapping regions into super regions. As described above, the non-overlapping regions may be generated from an intermediate graphical representation, such as a fillmap or a planar-map. Grouping non-overlapping equivalent regions into super regions reduces the number of kernels that need to be launched compared to parallel rendering of regions individually. The number of kernels needed to be launched is reduced by grouping the equivalent regions into super regions, down from the count of regions to the count of super regions, thus reducing the proportion of kernel launch overhead within the overall process.

Grouping equivalent regions into super regions also increases transfer data size from CPU to GPU per kernel launch, whilst decreasing the number of such transfers. Decreasing the number of transfers results in higher overall efficiency by increasing data transfer throughput.

A kernel may be launched for each super region in order to render all the pixels covered by that super region. The super region is represented by a data structure that will be used to render pixels within the super region, using massive parallelism, with one thread per pixel. As described below, the data structure may be used for rendering the pixels concurrently to render an image. The regions grouped into the super region are associated with equivalent fill compositing stacks, so that there is no divergence in instructions executed in each GPU thread). One kernel may be used to render all pixels in one super region.

Figure 6:
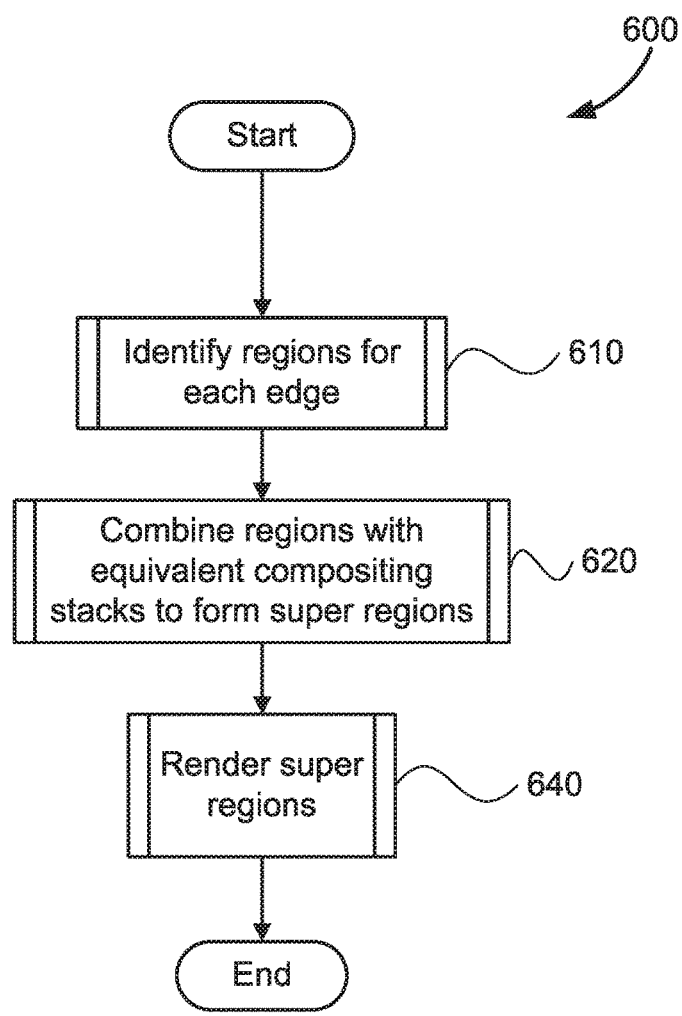
FIG. 6 is a schematic flow diagram showing a method of rendering regions of an image.

A method 600 of rendering an image will now be described with reference to FIG. 6. The method 600 may be implemented as one or more of the software code modules of the controlling program 181 resident in the memory 190 and being controlled in its execution using a combination of the CPU and GPU controller processors 170 of the pixel rendering system 100. The image has a corresponding fillmap which may be stored in memory 190.

The method 600 begins at identifying step 610, where regions of pixels of each fillmap edge, of a fillmap representing the image, are identified under execution of the processors 170. The regions of pixels are identified at step 610 using edge data from the fillmap. The identified regions of pixels are non-overlapping regions of the image being rendered. As described in detail below, each region of pixels is associated with a fill compositing stack comprising a plurality of levels to be composited to determine colour data of the region, each level being defined by a compositing operation and one or more colour operands. The described methods are configured for iterating the levels of the compositing stack for a pixel being rendered and executing compositing operations specified in each level of the compositing stack. The determined regions of pixels 610 may be stored in the storage device 190.

FIGS. 7A, 7B, 7C 7D and 7E show structures used in identifying regions and region data from an example fillmap tile 710, as at step 610. The fillmap tile 710 in FIG. 7A has dimensions of three (3) pixels wide by four (4) pixels high. However, larger size fillmaps (e.g., 512 pixels by 512 pixels) may also be used to achieve even greater efficiency.

The fillmap tile 710 in FIG. 7A has five edges 704, 705, 706, 707 and 708, with each edge being referenced by edge indices. For example, edge 704 is 'edge 0' and edge 708 is 'edge 4'. The order of edge indices is the order of edges in the original fillmap representation 402 (e.g., the fillmap representation 540 in FIG. 5B) where the edges are ordered by a starting y-coordinate. The x-coordinates of the edges are described by horizontal indices 703 and the y-coordinates are indicated by vertical indices 709.

FIG. 7B shows regions 723, 724, 725, 726 and 727 formed from the edges 704, 705, 706, 707 and 708 in FIG. 7A. As an example, region 'R0' 723 for a selected edge 704 is defined by four sides:
a) a left boundary consisting of the selected edge 704;
b) a right boundary which, for each row within rows spanned by selected edge 704, consists of the pixel before a next edge 706 to the right of the edge 704 on the same row, or the last pixel of the tile 710 if there are no other edges to the right of the selected edge 704. Using a sorted edge matrix described below, a right boundary x value for a selected edge at a selected row is the first non-empty entry, to the right of the selected edge column at that row;
c) a top boundary 720 from the top of the selected edge 704 to the top of the right boundary; and
d) a bottom boundary 721 from the bottom of the selected edge to the bottom of the right boundary.

As the region R0 723 only has one single pixel wide column, the left boundary and the right boundary share the same single pixel area.

As another example, region R2 724 has a left boundary defined by edge 706 and a right boundary 722 formed by the last pixel of a first row at (2, 0). The regions (e.g., R2 724) are for illustrative purposes only, and the regions (e.g., R2 724) can be more complex, and not just rectangular.

Identification of the regions of the fillmap tile 710 will now be described. Each edge in the fillmap tile 710 is processed sequentially. The edges are used to populate an edge matrix, such as the edge matrix 780 of FIG. 7D, where each column 791 represents one edge, and the rows 790 represent the y-values (or scanlines) of the fillmap tile 710. Starting from the start y-coordinate of an edge and working down the edge by increasing y-coordinate, x-coordinate values are set into a corresponding column of the edge matrix until the last y-coordinate of the edge. Each value is the x-coordinate for the edge if the edge exists at that row (y-coordinate). Using the fillmap tile 710 of FIG. 7A, edge 1 706 is used to populate the column at x=1 792. The x value of one (1) at 793 is the x-coordinate of the edge at y=0.

Once the edge matrix 780 in FIG. 7D is completed for all edges, the edge matrix 780 is sorted into a sorted edge matrix, such as the matrix 785 shown in FIG. 7E. The edge matrix 780 is sorted into the sorted edge matrix 785 by sorting the columns 791, where each of the columns represent an edge. The edges (columns) are sorted by re-arranging the columns such that for any scan line, the x-coordinates are in ascending order along the scanline. The mapping from column indices 770 to edge indices 772-775 is captured in a list, SortedEdgeIndexList 771.

In the example edge matrix 780, as seen in FIG. 7D, edges 792 and 794 have been swapped to form the sorted edge matrix 785 in FIG. 7E. The edge at column 792 has been moved to column 797 in the sorted edge matrix, and the edge at column 794 has been moved to column 796 in the sorted edge matrix. The SortedEdgeIndexList 771 records the edge swap at 773 and 774.

Once the sorted edge matrix, such as the matrix 785 shown in FIG. 7E, is created for the fillmap tile 710, region data structures ('RegionData') such as region data structures 765, 766, 767, 768 and 769 shown in FIG. 7C, are created to record details of each region. For example, region data structure 765 is created for region R0 723 associated with edge 0 704.

A region data structure (RegionData) such as structure 765 is used to record details of the pixels in a region.

Each region data structure (RegionData) includes region data comprising the following variables to be set during identifying region pixels at step 610:
  a) StartY 750: a starting y co-ordinate corresponding to the row number of the first scan line in the region.
  b) RegionHeight 751: the number of rows (scan lines) spanned by the region.
  c) TotalPixels 752: the total number of pixels in by the region.
  d) StackIndex 753: an index into a separate compositing stack structure (as discussed below), to indicate the compositing stack corresponding with the edge of the region.
  e) InSuperRegion 754: a Boolean (used during super region construction) to indicate whether the region has yet been integrated into a super region. InSuperRegion 754 is initially set to False.
  f) RowList 755: a list of row information in the form of row descriptors, one per row of the region data, each containing:
    1. RowIndex 756: the index of the row inside the region;
    2. StartX 757: the start x-coordinate of the row inside the region;
    3. StartPixelIndex 758: the pixel number (within the region) which begins the row (as described below);
    4. RunLength 759: the number of pixels of the region at the row;

Since each edge in a fillmap tile corresponds to a region, one RegionData instance is created using each column in the sorted edge matrix 785 as seen in FIG. 7E. StartY 750 is set to equal the row value of the first non-empty entry in the column referenced by the column index, working downwards in increasing y-coordinate. RegionHeight 751 will be the row count between first and last non-empty entries in each column. Total Pixels 752 can be established by working down the rows covered by each particular edge, accumulating the pixels from the x value for the particular edge at each row through to the x-coordinate before the next edge (or x-coordinate of the last pixel of tile). StackIndex 753 comes directly from the compositing data for the edge, indexed by the SortedEdgeIndexList 771 at a given column index.

RowList 755 inside the RegionData structure is built up scanline by scanline from the sorted edge matrix. Each entry in the RowList 755 for a region is built from active rows inside the sorted edge matrix. Each RowList row entry, referred to as RowInfo, contains a RowIndex 756, as the next index of the new row to be appended into the RowList 755. For each edge in the sorted edge matrix, non zero entries in each row represent the start x pixel for the edge in that row, or StartX 757. The right edge is the next non-zero value to the right on that row. If there are no such values, then the right edge will be the right edge value of the scanline RunLength 759 represents the difference in the left and right edge values. StartPixelIndex 758 is recorded by accumulating the pixel count as rows of each edge are scanned.

As an example of row calculation, the edge 707 is represented in the sorted edge matrix by column 3 730. Working down the column, the first active row 731 is at y=2. The entry at the point y=2 is zero (0), so StartX 757 is set as zero (0). The first non zero entry to the right is 2 732, indicating that the next edge begins at x=2. RunLength 759 can be set as the difference between these, as 2−0=2.

As each of the RegionData structures are identified for the regions in a tile, the RegionData structures are added to a list, RegionDataList, such as example RegionDataList 909 of FIG. 9. The RegionData structures are assigned a sequential region identifier (ID) 916. In the example shown in FIGS. 7A, 7B, 7C, 7D and 7E using the method 600 described above, five RegionData structures R0-R4 765, 766, 767, 768, 769 have been created from the fillmap tile, each containing sufficient data about each region to allow the creation of super regions.

As described above, regions with 'equivalent' compositing stacks are grouped to be processed by a single GPU kernel. Combining regions increases the efficiency of the rendering process by decreasing the overall kernel launch costs. Fewer launches are needed than would be needed than if the regions were not combined.

Also at step 610, one compositing stack associated with each of the regions is identified under execution of the processors 170. Compositing stacks are considered to be 'equivalent' when the stacks contain the same level count (i.e., the same number of stack levels), with the same compositing operations, operand types and pre-post-processing functions at each level, but different compositing operation operand parameters for each level, if the operand types is not 'group'. In this instance, the equivalent composting stacks are defined by equivalent sets of graphical commands applied to different colour operands.

If the operand type is 'group', then the group sub-compositing stacks must themselves be equivalent, according to the same definition.

In other arrangements, equivalence may be extended to include pre and post processing functions associated with each level. To preserve equivalence, the pre and post processing functions are identical across levels in such arrangements.

Figure 8A:
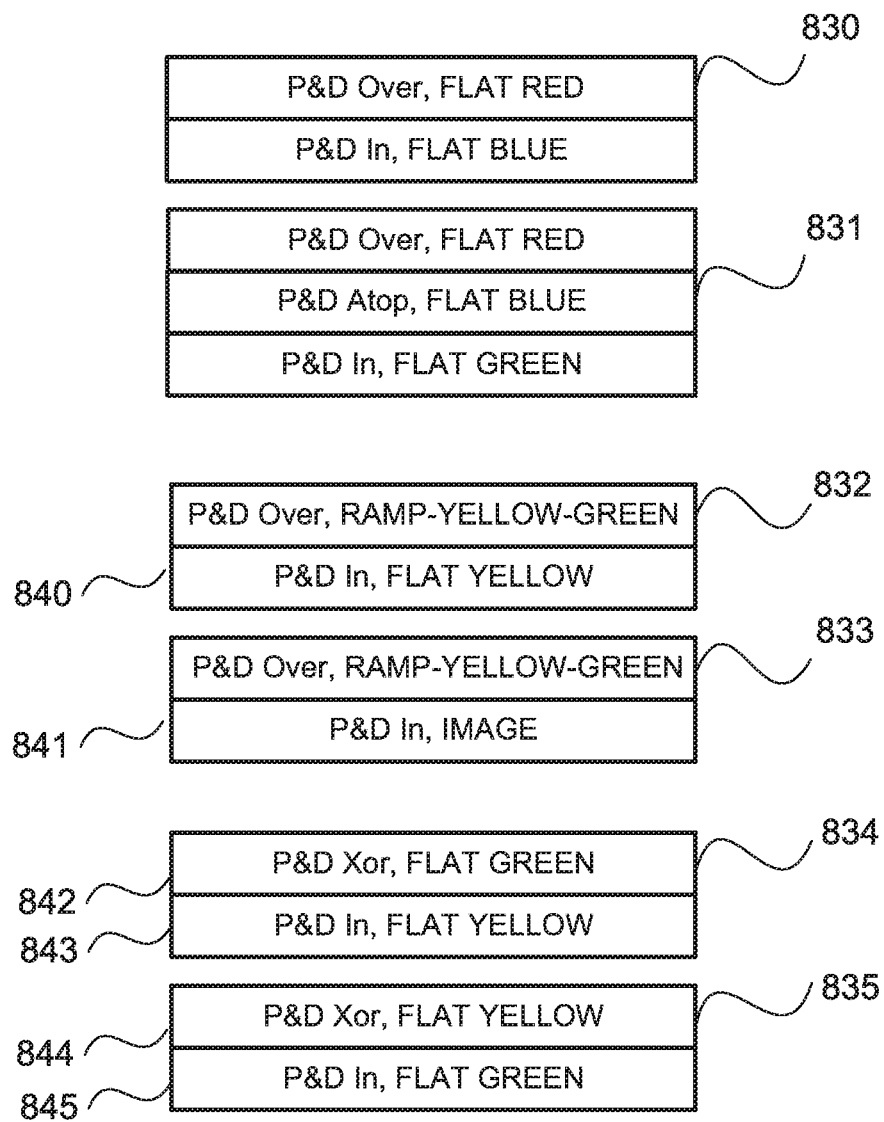
FIG. 8A shows example compositing stacks.
Figure 8B:
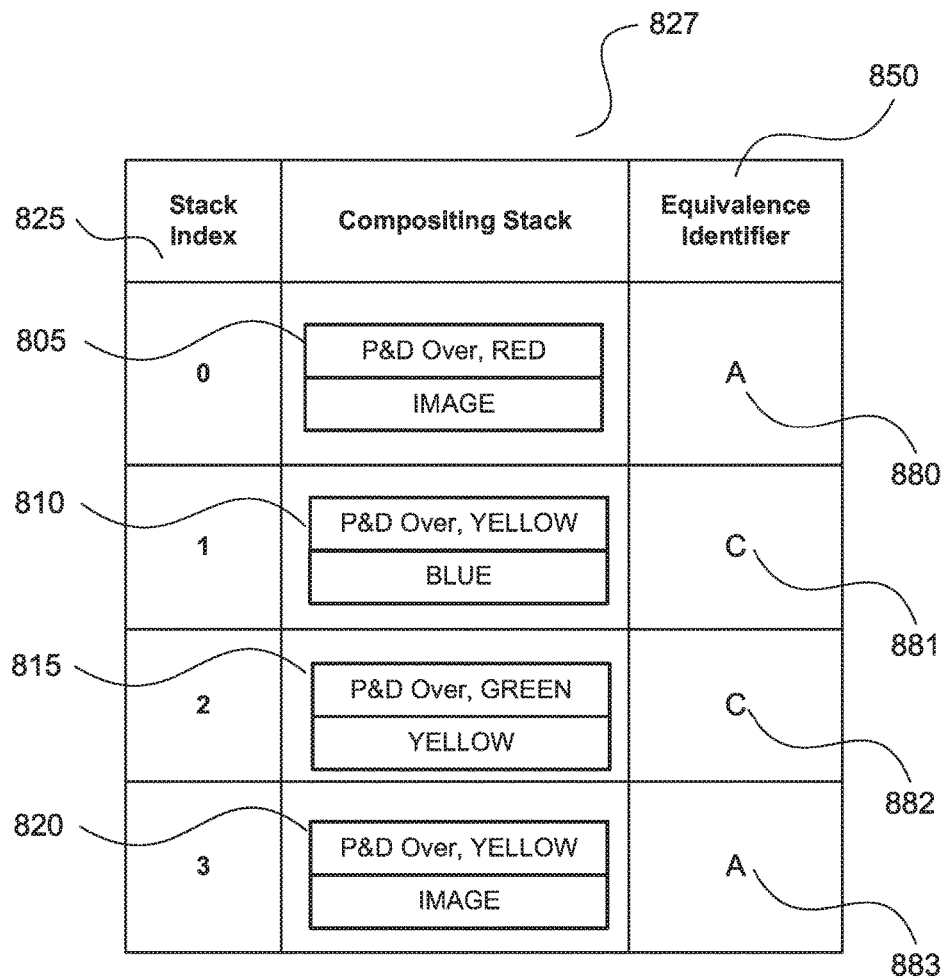
FIG. 8B shows an example of a compositing stack table.

FIG. 8A shows sample compositing stacks 830-835. For the example of FIG. 8A, all the operations are assumed to be Porter and Duff compositing algebra, but with the variants shown (e.g., 'xor' or 'over').

Stacks 830 and 831 are not equivalent, since the stacks 830 and 831 have differing level counts. Stacks 832 and 833 are also not equivalent, because the compositing operation at the lower compositing level has differing operand types, flat colour 840 and image 841. However, stacks 834 and 835 are considered to be equivalent, because the stacks 834 and 835 have both the same compositing operations and operand types at all the same levels (842 and 844, and 843 and 845), even though the operands are different. For instance, the fills at 842 and 844 both have the same operation (Porter and Duff Xor) and the same operand type Flat Colour. The fills 842 and 844 only differ in their operands (Green vs Yellow) so that the fills are considered equivalent. The second level at 843 and 845 of the stacks 834 and 835, respectively, is similarly equivalent, so the compositing stacks 834 and 835 are considered equivalent.

Pixels with compositing stacks that are not identical (only equivalent) may still be processed in larger and more efficient GPU kernels, whilst still avoiding instruction divergence inside the GPU (i.e. each thread of the GPU kernel will follow the same instructions applied to different input data (or parameters)).

As part of identifying regions from a fillmap, the compositing stack for each region is recorded in a table such as Compositing Stack Table 827 in FIG. 8B, where each compositing stack is referenced with an index, StackIndex 825. For identifying equivalent compositing stacks, an identifier 850 referred to as an 'equivalence identifier' is determined for every compositing stack based on the compositing operation, operand types and level count within the compositing stack. The equivalence identifier identifies the compositing stack based on level compositing operations and level operand types in the compositing stack. In one arrangement, a hash function may be used to determine the equivalence identifier using the compositing operations and associated operand types. All equivalent compositing stacks share the same equivalence identifier 850. In the Compositing Stack Table 827, compositing stacks 810 and 815 are equivalent, because the compositing stacks 810 and 815 each have an equivalence identifier 850 with value 'C'. As another example, an operation for two transparent colours might map to 'A', whilst another operation for an image with flat colour operands might be mapped to 'C', as shown in FIG. 8B.

Figure 21:
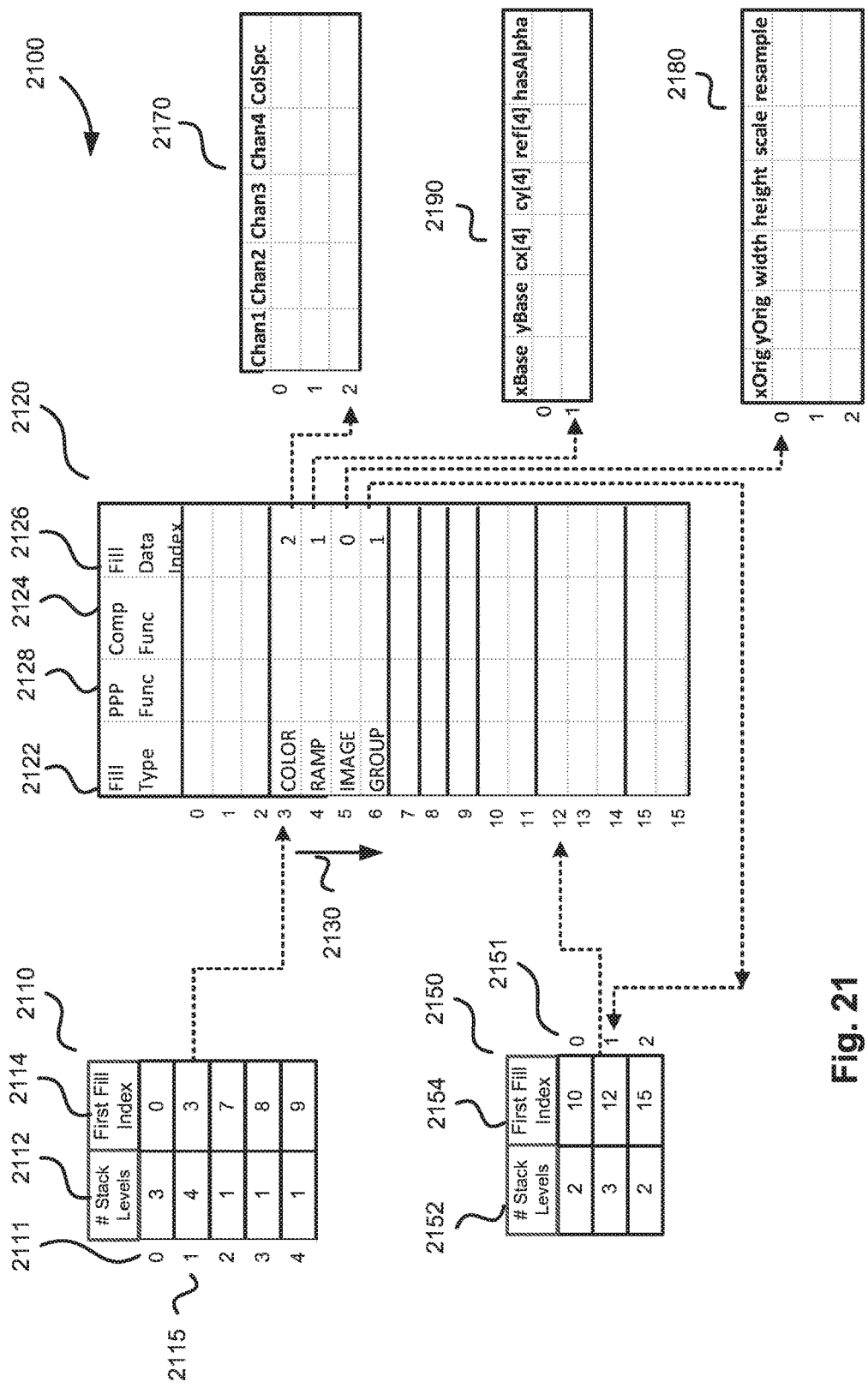
FIG. 21 shows a data structure for the compositing stacks for the regions in a fillmap tile.

A data structure 2100 for the compositing stacks for the regions in a fillmap tile (e.g., fillmap tile 710) is described with reference to FIG. 21. The structure 2100 of FIG. 21 shows lower level versions of the compositing stack structures described above. Compared with the high level structures described above, fill type (Fill Type) 2122 corresponds to operand type, compositing function (Comp Func) 2124 corresponds to compositing operation, and fill data index (Fill Data Index) 2126 corresponds to operand parameters. Compositing stack table 2110 serves as a set of pointers into the level appearance table 2120, rather than as simple storage for a compositing stack, as described above.

The data structure 2100 is defined with the following tables:
1) compositing stack table 2110
2) level appearance table 2120
3) flat colour rendering table 2170
4) ramp colour rendering table 2190
5) image rendering table 2180
6) group rendering stack 2150

The compositing stack table 2110 has one column 2112 indicating the number of level appearances and another column 2114 for the index to the first fill element in the level appearance table 2120. Each row corresponds to an edge/region. The indices 2111 of the compositing stack table 2110 are the edge indices. The compositing stack for the region 1 contains four level appearances starting from index three (3) to index six (6) in the level appearance table 2120 in a top to bottom direction 2130.

The level appearance table 2120 contains rendering and compositing information with the following columns:
a) 'Fill Type' column 2122 indicates which rendering table to use. Example fill types include flat colour fill (uniform colour), ramp fill (a colour gradation) and image fill (fill with a bitmap). Each fill type is associated with a rendering table (i.e., flat colour rendering table 2170), the ramp colour rendering table 2190, the image rendering table 2180 and the group rendering table 2150. If the fill type is COLOUR, the flat colour rendering table 2170 is used for rendering.
b) 'Fill Data Index' column 2126 has the index to the corresponding rendering table. For example, the first COLOUR fill type in row 3 of the level appearance table 2120 has an index, FillDataIndex, of two (2), which is used as the index to the third colour in the flat colour rendering table 2170. In row 5 of the third fill type, IMAGE fill, associates the level appearance with the first element (index 0) in the image rendering table 2180.
c) 'Pre-Post-Processing (PPP) Function' column 2128 defines one or more functions, such as a colour conversion function or dithering, that need to be executed before or after the rendering and compositing. A colour conversion function from RGBA to CMYK might also be defined in the PPP Function column 2128.
d) 'Compositing Function' column 2124 indicates what compositing function to use and a number of operands. Compositing functions include the Porter-Duff compositing operators. There are two operands: source colour and destination colour, where the source colour corresponds to the colour rendered by the rendering function defined in the same row, and the destination colour is the resultant colour from rendering previous level appearances.

More columns may be added to the level appearance table 2120 (e.g., number of ROPs (Raster OPerators)).

The flat colour rendering table 2170 defines four channels of colour components which might correspond to RGBA, CMYK or others, and a colour space type. If the colour space type is RGBA, variables Chan1, Chan2, and Chan3 store the red, green, and blue channels respectively, and variable Chan4 stores an alpha (or opacity) channel. The flat colour rendering table 2170 can be extended with more channels. Alternatively, a flat colour table with a different number of channels could be split into separate tables. For example, the COLOUR fill type might be changed to COLOUR4 and COLOUR6 corresponding to a 4-channel flat colour rendering table and a 6-channel flat colour rendering table.

The ramp colour rendering table 2190 has several columns defined for parameters used to calculate a pixel colour at pixel position (x, y). Pseudocode which may be used to determine the pixel colour is listed below:

```
deltaX = x − xBase
deltaY = y − yBase
rampColour[0] = (int)(deltaX * cx[0] + deltaY * cy[0] + ref [0])
rampColour[1] = (int)(deltaX * cx[1] + deltaY * cy[1] + ref [1])
rampColour[2] = (int)(deltaX * cx[2] + deltaY * cy[2] + ref [2])
IF (hasAlpha)
THEN
    rampColour[3] = (int)(deltaX * cx[3] + deltaY * cy[3] + ref [3])
ELSE
    rampColour[3] = 255
```

As different gradient colour formulas, such as radial gradient, require different parameters, a different rendering table with different parameters may be defined.

The image rendering table 2180 defines the image portion that will be used to render a pixel colour. A whole image or a portion of an image may be transferred to the GPU 172. If a portion (e.g., a band or a strip) is used, the coordinate (xOrig, yOrig) defines the origin of the image band, and the coordinates (width, height) corresponds to the dimensions of the image band. The table 2180 also has a column for a scaling factor to apply to the image and another column for a re-sampling or interpolation mode (e.g., linear interpolation or cubic-interpolation). As the architecture of the GPU 172 has special texture units, hardware acceleration of the image scaling may be advantageous. However, the rendering quality needs to be checked. If the rendering quality does not meet expectations, the image scaling kernel function needs to be rewritten for more precision and border checking on the GPU 172.

The group rendering table 2150 has similar columns to the compositing stack table 2110, where the first column 2152 contains the number of level appearances or number of elements in the level appearance table 2120 and the second column 2154 contains the Fill Data Index referencing the level appearance table 2120. Each entry in the group rendering table 2150 represents a sub-compositing stack that is referenced by a fill data index 2126 from the level appearance table 2120. While the indices 2111 of the compositing stack table 2110 correspond to the edge indices, the indices 2151 of the group rendering table 2150 are numbers from the Fill Data Index column 2126 in the level appearance table 2120.

Returning to FIG. 6, having identified the regions and associated compositing stacks in step 610, the method 600 proceeds to combining step 620. At step 620, the regions identified in step 610 are combined to form super regions, under execution of the processors 170. The super regions are formed by selecting the regions associated with equivalent compositing stacks. Pixels corresponding to the selected regions are used to create super region data structures ('SuperRegionData') by combining the region pixel data for the selected regions. The super region data structures preserve enough of the region data, including compositing stack references, to later render the pixel. Pixels corresponding to the super regions formed at step 620 may be stored in the memory 190.

Only the super region data structures, and not source region data structures, are passed to the processors 170 for rendering, where one of the processors 170 may be a GPU (e.g., 301) as described above.

In one arrangement, steps 610 and 620 are combined into a single step, such that the super regions are formed directly using fill compositing sequences associated with the fillmap edges.

All pixels in a super region may use different (but equivalent) compositing stacks, so there is a need to have one data structure that can be accessed by each thread to render a pixel with its correct compositing stack.

Figure 9B:
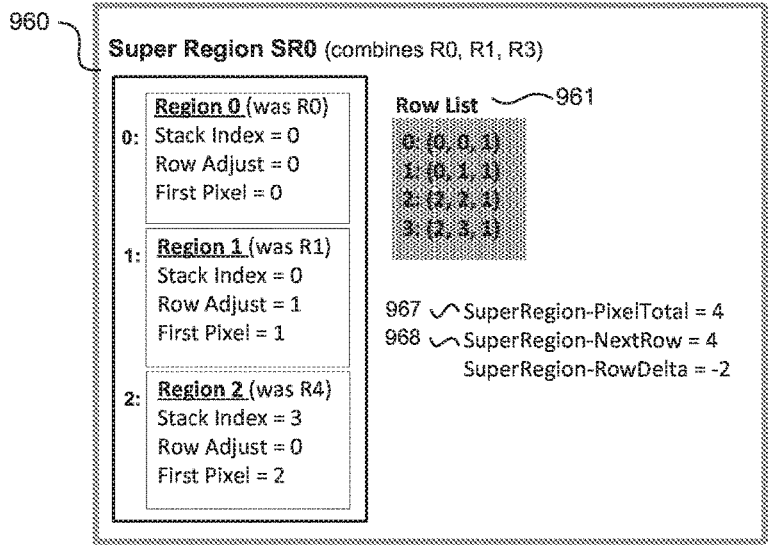
FIGS. 9B and 9C show examples of super region data structures.
Figure 9C:
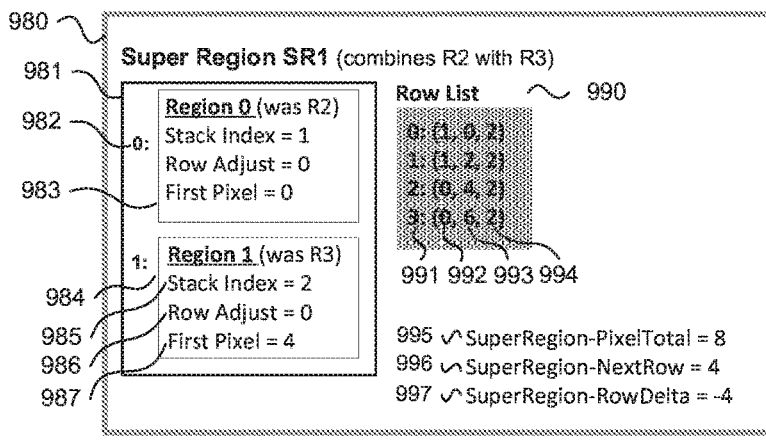

A method 1000 of forming super regions, as executed at step 620, will be described in detail below with reference to FIGS. 10, 11, 12 and 13. The method 1000 accesses regions from a region data list, RegionDataList, and creates a set of super regions, as super region data structures, SuperRegionData. The method 1000 will be described by way of example with reference to FIG. 9A which shows an example region data list, RegionDataList 909, derived from the fillmap in FIG. 7A. FIG. 9B and FIG. 9C show super region data structures, SuperRegionData, 960 and 980 that can be created from the RegionDataList 909. The output rendered pixels are concatenated into one output buffer of the super region, with size equal to the total number of pixels.

Figure 9D:
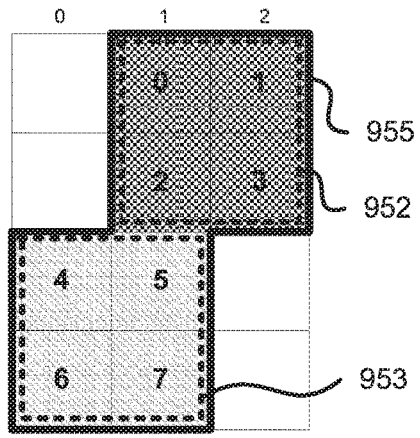
FIG. 9D shows an example of a super region.

The pixels in a super region are numbered sequentially and continuously from left to right (minimum to maximum x) in each row of the super region and from the top row to the bottom row (minimum to maximum y), as shown by example super region 955 in FIG. 9D. The super region comprises two regions 952 and 953. Each pixel in the super region has an associated identifier referred to as a pixel index. The leftmost pixel of the first row in the super region 955 has pixel index zero (0), the next pixel has pixel index one (1), and so on. If there are no pixels remaining to be numbered in a row of the super region 955, the next pixel is the leftmost pixel on the next row. The pixel numbers of the remaining pixels in the super region 955 are shown in FIG. 9D.

A super region data structure, SuperRegionData, such as 960 or 980, is used to record details of the pixels of each super region. As seen in FIG. 9C, each super region data structure, SuperRegionData, comprises:

a) RowList 990: a list of row descriptors. Rows in all regions inside a super region are concatenated into the list, RowList. Each row in the RowList is indexed 991 and contains:
1. StartX 992: the start x-coordinate of the row in the super region.
2. StartPixelIndex 993: the index of the first pixel of the row (within the super region). The index, StartPixelIndex, and StartX are used to calculate an x-coordinate of an arbitrary pixel given the index of the pixel.
3. RunLength 994: the number of pixels of the super region within the row associated with the RowList 990.

b) SuperRegion-RegionDataList 981: contains a number of data structures ('SuperRegion-RegionData') 983 and 984, one for each region in the super region, where each data structure, SuperRegion-RegionData, contains:
1. StackIndex 985: an index to the compositing stack for the region. Once a thread has established the output location of an associated pixel, then the thread can use the index, StackIndex, to establish the colour to write at that location.
2. RowAdjust 986: an adjustment variable for later output pixel calculation. The RowAdjust variable is used to determine the y-coordinate of the rendered pixel.
3. FirstPixel 987: a pixel index in the super region for the first pixel of the region. As outlined above, each pixel in a super region is enumerated from zero (0), and the value of the index, FirstPixel, is the pixel number that starts each region. The value of the index, FirstPixel, is used to build the region index list.

c) SuperRegion-PixelTotal 995: a variable representing a running count of the total pixels in the super region as new regions are added. The SuperRegion-PixelTotal variable is used during the creation of the super region in order to set the FirstPixel variable for each new region.

d) SuperRegion-NextRow 996: a variable representing a next super region row to be written. The SuperRegion-NextRow variable is used during the forming of the super region to keep track of the processed rows in the super region.

e) SuperRegion-RowDelta 997: a helper variable to calculate the value of RowAdjust in SuperRegion-RegionData 983. The SuperRegion-RowDelta variable is used during the forming of the super region.

SuperRegion-PixelTotal 995, SuperRegion-NextRow 996 and SuperRegion-RowDelta 997 are initialised with zero (0) before later use.

To allow later GPU processing, as new regions are added to a super region, the rows (in RowList 755) of the new region are all concatenated onto the RowList 990 for that super region. However, one region is unlikely to simply start at a final y value plus one for the previous region (i.e., there may well be an overlap in the last y value of the previous region with the first y value of another region). To account for such an overlap, a row adjustment variable, RowAdjust 986, is determined and stored alongside each region. When the rows inside each super region are later used in rendering, the value of RowAdjust 986 is used to translate from the super region row y values back into actual tile y values. The rendering process is described below.

To identify super regions, the compositing stacks of each of the region data structures, RegionData, such as region data structure 910 in the RegionDataList 909, are compared with the compositing stacks from all the other RegionData structures in the RegionDataList 909. Each region is compared with every other region for compositing stack equivalence. Equivalent regions are then grouped into super regions.

Figure 10:
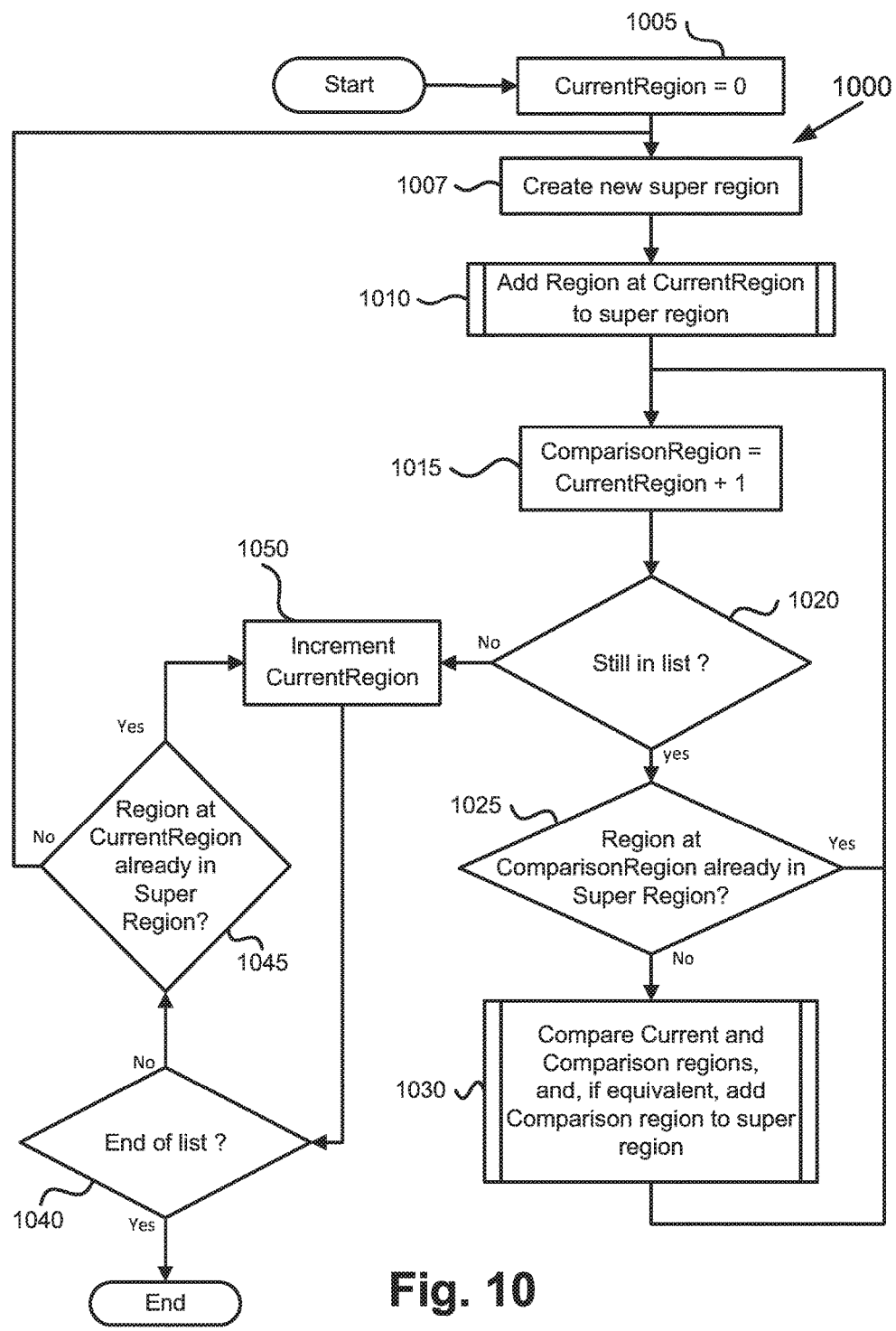
FIG. 10 is a schematic flow diagram showing a method of forming super regions from regions.

The method 1000 of forming super regions, as executed at step 620, is shown in detail in FIG. 10. The method 1000 may be implemented as one or more of the software code modules of the controlling program 181 resident in the memory 190 and being controlled in its execution using a combination of the CPU and GPU controller processors 170 of the pixel rendering system 100.

The method 1000 evaluates a plurality of non-overlapping regions of the image, as represented by a list of regions, such as the list of regions 909, and groups the regions into super regions, if there are any regions with equivalent compositing stacks. The method 1000 will be described by way of example with reference to the list 909. The regions represented by the list 909 are the regions identified at step 610. The controlling program 181 may be configured for receiving the list 909 representing the regions from the memory 190, for example. Two region identifiers, CurrentRegion and ComparisonRegion, may be configured within the memory 190 to act as pointers to regions inside the list.

The method 1000 begins at initialising step 1005, where the identifier CurrentRegion is set to zero to point to the first region in the list. Then at creating step 1007, a new super region data structure is created within the memory 190 under execution of the processors 170.

Then at adding step 1010, region 765 at the CurrentRegion is added to the new super region as a new SuperRegion-RegionData entry 983 in the list, SuperRegion-RegionDataList 981. A method 1200 of adding a region to a super region, as executed at step 1010, will be described below with reference to FIG. 12. As part of step 1010, region variable, InSuperRegion, is set to true, to indicate that the region 765 has been integrated into a super region.

At setting step 1015, the identifier, ComparisonRegion, is set to the region one beyond the region at CurrentRegion. Then at decision step 1020, if the region pointed to by ComparisonRegion is still inside the list 909, then the method 1000 proceeds to decision step 1025. Otherwise, the method 1000 proceeds to step 1050.

Then at decision step 1025, if the region pointed to by ComparisonRegion is already in a super region, then the method 1000 returns to step 1015. Otherwise, the method 1000 proceeds to comparison step 1030.

At comparison step 1030, the regions at CurrentRegion and ComparisonRegion are compared for equivalence, by checking for the equality of the equivalence identifier variables associated with regions CurrentRegion and ComparisonRegion. A method 1100 of comparing two regions for equivalence and creating super regions, as executed at step 1030, will be described below with reference to FIG. 11. If the regions at CurrentRegion and ComparisonRegion are equivalent, then the region at ComparisonRegion is appended into the current super region, in accordance with the method 1200. Once again, as part of step 1030, the region variable, InSuperRegion, is set to true to indicate that the region at ComparisonRegion has been integrated into a super region. The method 1000 returns to step 1015, where the identifier ComparisonRegion is incremented, and equivalence checks begin again on the next region.

Once all of the regions in the list 909 have been compared, then the method 1000 moves to incrementing step 1050. At step 1050, the identifier CurrentRegion is incremented. Then at decision step 1040, if the end of list 909 has been reached, then the method 1000 concludes. Otherwise, the method 1000 proceeds to decision step 1045. If the region pointed to by CurrentRegion is not already in a super region, then the method 1000 proceeds to step 1007, where a new super region is created, and all the remaining regions in the region list 909 are compared with the region pointed to by CurrentRegion (i.e., a current region) for possible membership of the new super region.

The method 1200 of adding a region to a super region, as executed at step 1010, will now be described with reference to FIG. 12. The method 1200 may be implemented as one or more of the software code modules of the controlling program 181 resident in the memory 190 and being controlled in its execution using a combination of the CPU and GPU controller processors 170 of the pixel rendering system 100.

The method 1200 adds or appends a region represented by a region data structure, RegionData, to a super region represented by a super region data structure, SuperRegionData. The addition of data of each region into a super region data structure requires:

appending the rows of a region into the super region row list, adjusting the incoming row variables where necessary to reflect the position of the rows in the super region data structure;

appending a subset of remaining region data into the super region data structure;

updating total pixel count of the super region with the pixel count of the incoming region;

and updating SuperRegion-RowDelta variable, as later used in adjustment of super region row y-values into actual row y-values.

The method 1200 begins at updating step 1205, where the RowList 755 for the region to be added to the super region is used to update the RowList 990 of the super region, under execution of the processors 170. A method 1300 updating the super region, as executed at step 1205, will be described in detail below with reference to FIG. 13.

Then at creating step 1210, a new SuperRegion-RegionData structure 983 is created, under execution of the processors 170, based on the added region.

At initialising step 1220, the new SuperRegion-RegionData entry is initialized for variables StackIndex 985, RowAdjust 986, and FirstPixel 987, as follows:

StackIndex = region's StackIndex;
RowAdjust = SuperRegion−RowDelta + region's StartY; and
FirstPixel = SuperRegion−PixelTotal.

StackIndex 985, RowAdjust 986, and FirstPixel 987 are variables defined in a SuperRegion-RegionData structure for each region inside the super region. SuperRegion-PixelTotal 995 and SuperRegion-RowDelta 997 are variables defined globally for the super region data structure 980. SuperRegion-PixelTotal and SuperRegion-RowDelta are set as new regions and added to the super region associated with the super region data structure 980.

The variable, SuperRegion-PixelTotal, keeps track of total pixels so far added into the super region. The variable, SuperRegion-RowDelta, is a helper variable used to determine the row adjustment variable RowAdjust. The variable StackIndex in the new SuperRegion-RegionData is set to the same as the StackIndex of the incoming region. RowAdjust equals the value of the SuperRegion-RowDelta (initially set to 0) plus the value of the StartY for the incoming region.

At appending step 1235, the initialized SuperRegion-RegionData data structure is appended to the list of per-region information held in the variable SuperRegion-RegionDataList 981 for the super region data structure 980.

Then at setting step 1240, the variable SuperRegion-RowDelta 997 for SuperRegionData is updated using the RowAdjust 986, StartY 750 and RegionHeight 751 for the RegionData. SuperRegion-RowDelta is a helper variable used for determining the RowAdjust 986 for the next region as follows:

SuperRegion-RowDelta=RowAdjust−(StartY+Region-Height)

The method 1200 then proceeds to step 1245, where SuperRegion-PixelTotal, which records cumulative pixel count in the super region, is updated by adding the pixel count from the incoming region. SuperRegion-PixelTotal is used, as described below, to identify the start pixel (within the super region) of the next region, when the next region appears as follows:

SuperRegion-PixelTotal=SuperRegion-PixelTotal+Total Pixels

The method 1200 then proceeds to step appending step 1250, where the variable SuperRegion-NextRow 996 for the SuperRegionData is appended with the height in pixels of the region. As described below, SuperRegion-NextRow is used to identify the start row (within the super region) of the next region, when the next region appears, as follows:

SuperRegion-NextRow=SuperRegion-NextRow+RegionHeight

Then at setting step 1265, Boolean value, InSuperRegion 754, in the super region is set to true, to indicate that the RegionData structure has been processed into a SuperRegionData structure, and should be ignored when building other super regions.

Figure 13:
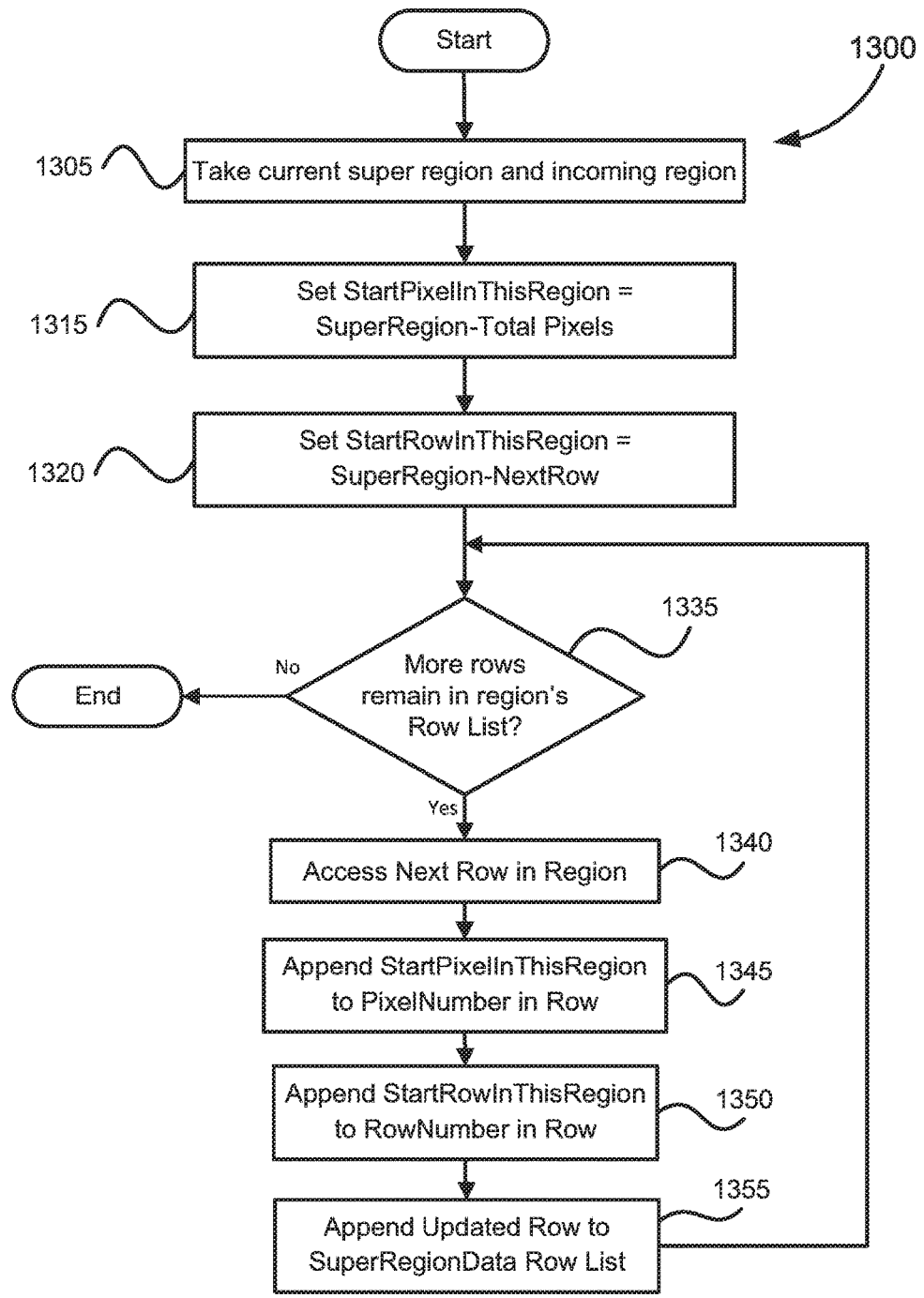
FIG. 13 is a schematic flow diagram showing a method of updating a super region.

The method 1300 of updating the super region with a region, as executed at step 1205, will now be described with reference to FIG. 13. The method 1300 may be implemented as one or more of the software code modules of the controlling program 181 resident in the memory 190 and being controlled in its execution using a combination of the CPU and GPU controller processors 170 of the pixel rendering system 100. In the method 1300, row lists from the region are appended to the row list for the super region, with the start pixel index for each row entry being amended to reflect the pixel arrangement of the super region. As rows from a number of regions are concatenated into one row list and the pixel indices re-enumerated for every pixel of the grouped regions, each super region row entry value of row number and starting pixel is set to be correct within the context of the region within the super region.

The method 1300 begins at accessing step 1305, where the SuperRegionData and RegionData structures are accessed from the memory 190 under execution of the processors 170. Then at setting step 1315, the start pixel (within the super region) of the region is set as equal to the SuperRegion-TotalPixels as follows:

StartPixelInThisRegion=SuperRegion-TotalPixels

At setting step 1320, the start row (within the super region) for the region is recorded in the current value of SuperRegion-NextRow as follows:

StartRowInThisRegion=SuperRegion-NextRow

The method 1300 continues to steps 1335 to 1355, where all the rows in the region are processed, to update the start pixel and row numbers for each region row to reflect the super region pixel and row numbers, as follows:

region row's StartPixelIndex = region row's StartPixelIndex + StartPixelInThisRegion
region row's RowNumber = region row's RowNumber + StartRowInThisRegion At appending step 1355, the updated row is appended to the end of the RowList 990 for the super region. The row entries StartX 757 and RunLength 759 remain unchanged in the appended row. The method 1300 returns to step 1335 following step 1355.

At decision step 1335, if no more rows remain in the RowList for the region, then the method 1300 concludes.

Figure 11:
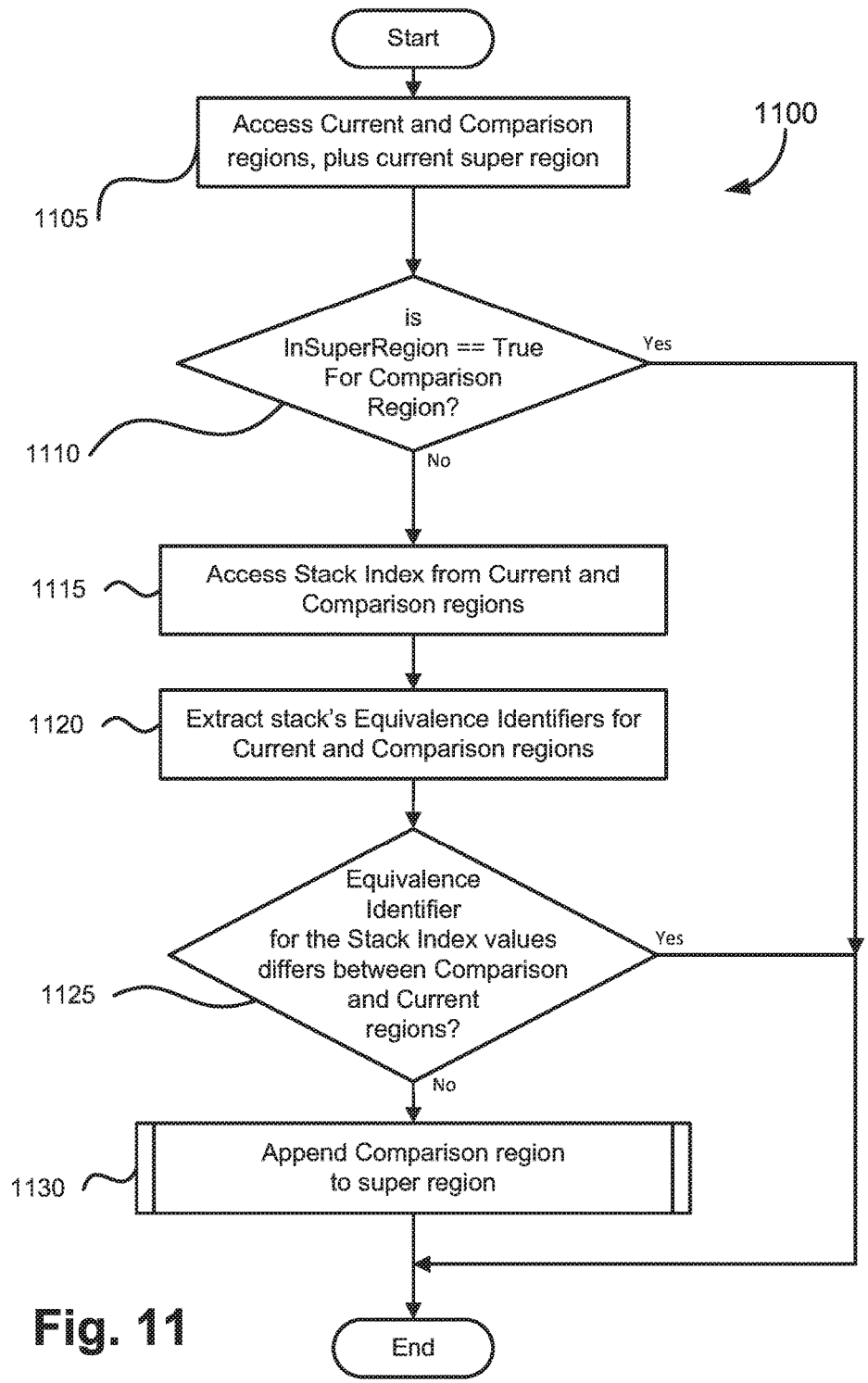
FIG. 11 is a schematic flow diagram showing a method of comparing two regions for equivalence and creating super regions.

The method 1100 of comparing two regions for equivalence and creating super regions, as executed at step 1030, will now be described with reference to FIG. 11. The method 1100 may be implemented as one or more of the software code modules of the controlling program 181 resident in the memory 190 and being controlled in its execution using a combination of the CPU and GPU controller processors 170 of the pixel rendering system 100.

The method 1100 begins at accessing step 1105, where the regions at CurrentRegion and ComparisonRegion are accessed from the memory 190 under execution of the processors 170. The current super region is also accessed at step 1105. Then at decision step 1110, if the region variable, InSuperRegion, is set to true indicating that the region at ComparisonRegion has been integrated into a super region, the method 1100 concludes. Otherwise, the method 1100 proceeds to accessing step 1115.

At step 1115, StackIndex values from both the regions at CurrentRegion and ComparisonRegion are accessed, under execution of the processors 170. Then at extracting step 1120, the StackIndex values from both the regions at CurrentRegion and ComparisonRegion are used as indexes into a compositing stack table (e.g., 827) to extract equivalence identifiers for the regions.

At decision step 1125, if the extracted equivalence identifiers differ for each of the CurrentRegion and ComparisonRegion, then the method 1100 concludes. Otherwise, the method 1100 proceeds to appending step 1130. At step 1130, the region at ComparisonRegion is appended to the current super region.

The creation of super regions from the regions described in the list, RegionDataList 909, will be further described by way of the example with reference to FIGS. 9A and 9B.

The example of identifying regions, as at step 610 described above, results in the list of regions in the list RegionDataList 909 shown in FIG. 9A. Super regions may be created using the list, RegionDataList 909. Since regions at index 0 (910), index 1 (911) and index 4 (914) have compositing stacks with the same equivalence identifier, the regions at index 0 (910), index 1 (911) and index 4 (914) are joined in the example described below to form the super region 0 in FIG. 9B. Similarly, regions 2 (912) and 3 (913) share compositing stacks, so a similar process may be used to create super region 1 shown in FIG. 9C.

As described above, at step 1005, the identifier CurrentRegion is set to zero (0), indicating that the region at position zero (0) (i.e., the first region entry 910 in the RegionDataList), is now the current region. The current region is compared with other region entries 911, 912, 913, 914 in the RegionDataList 909. As at step 1007, a new super region data structure, SuperRegionData 960, is created, and initialised with variables set to zero, with an empty RowList. As at step 1010, the current region R0 910 is appended to the newly created SuperRegionData 960 in accordance with the method 1200.

Figure 12:
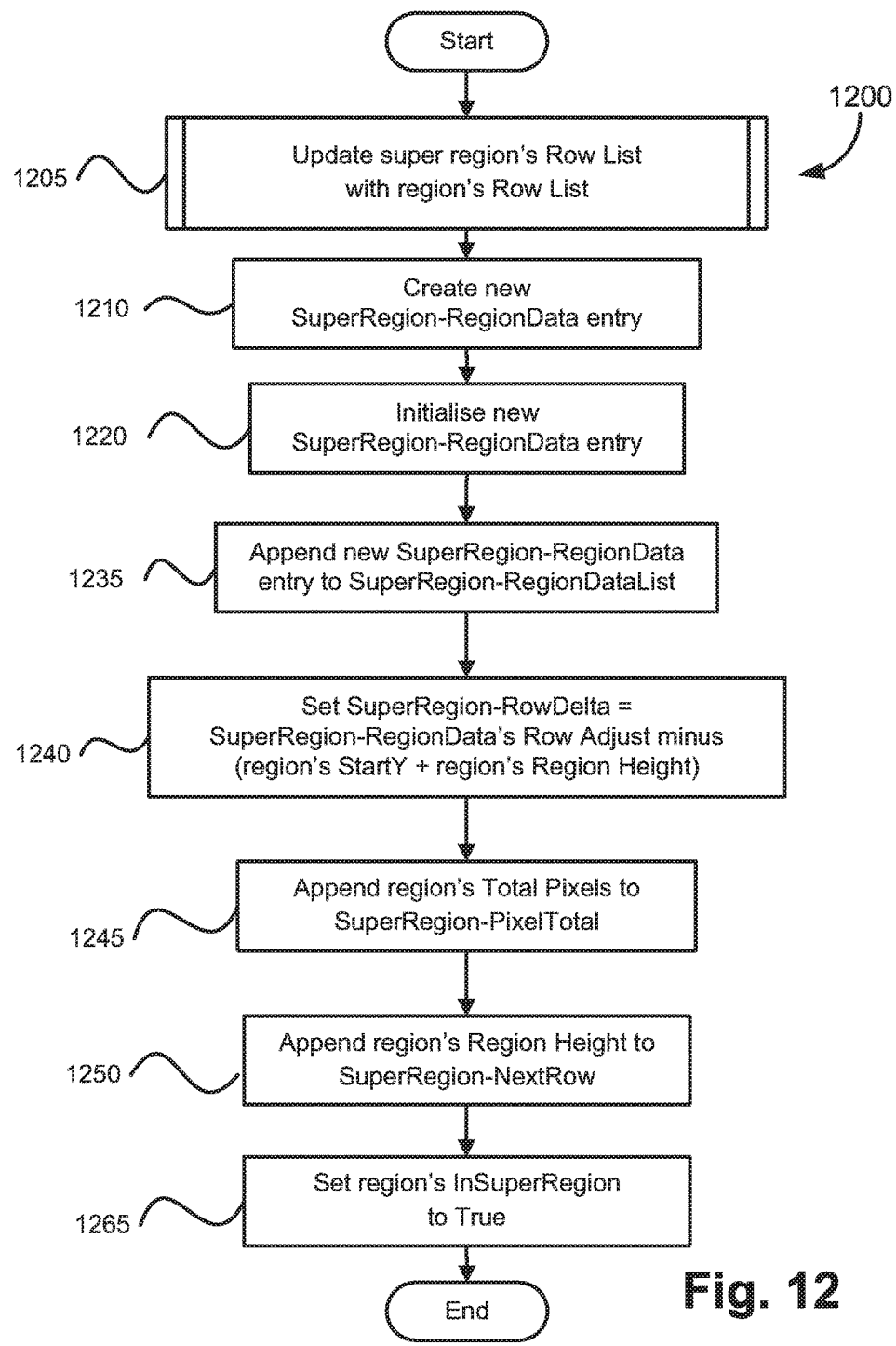
FIG. 12 is a schematic flow diagram showing a method of updating a super region data structure with a region data structure.

Turning now to FIG. 12, at step 1205, the RowList 920 for the current region is used to update the RowList 961 for the super region in accordance with the method 1300.

Steps 1315 and 1320 set the start pixel and row for the region as follows:

StartPixelInThisRegion = SuperRegion-Total Pixels = 0
StartRowInThisRegion = SuperRegion-NextRow = 0

Since the values of StartPixelInThisRegion and StartRowInThisRegion are both zero, the single row in the RowList 920 for the region is copied unchanged through step 1345 and 1350 into the RowList 961 for the super region. At step 1355, the row is appended to the end of the RowList 990 for the super region.

Returning to FIG. 12, as at step 1210, a new SuperRegion-RegionData structure 983 is created and variables of SuperRegion-RegionData structure 983 are initialised as follows:

StackIndex = region's StackIndex = 0
RowAdjust = SuperRegion-RowDelta + region's StartY = 0
FirstPixel = SuperRegion-PixelTotal = 0

The new SuperRegion-RegionData structure is added to the SuperRegion-RegionDataList in step 1235.

In step 1240, SuperRegion-RowDelta 997 is updated as follows:

SuperRegion-RowDelta=RowAdjust−(StartY+RegionHeight)=0−(0+1)=−1

As at step 1245, SuperRegion-PixelTotal 995 is appended with the size of the region in pixels (value=1), to add the incoming pixel count of the region to the super region pixel count.

As at step 1250, SuperRegion-NextRow 996 is appended with the height of the region in pixels as follows:

SuperRegion-PixelTotal = SuperRegion-PixelTotal + TotalPixels = 1 + 0 = 0

SuperRegion-NextRow = SuperRegion-NextRow + RegionHeight = 0 + 1 = 1

As at step 1265, the Boolean value, InSuperRegion 754, for the region is set to true, to ensure the region is not considered for future super region inclusion.

Returning to FIG. 10, as at step 1015, to get the next region, the variable ComparisonRegion is incremented to point to the region after the first region (i.e., pointing to region R1 911). In the example of FIGS. 9A to 9C, the value of ComparisonRegion passes end of list check (as at step 1020), and 'already in super region' check (as at step 1025), so the two regions R0 910 and R1 911 are compared for equivalent compositing stacks (as at step 1030). The StackIndex values from both regions R0 910 and R1 911 (StackIndex 932=0, StackIndex 933=0) are used as indexes into the compositing stack table 827 (as at step 1115 of the method 1100), and result in the same equivalence identifiers "A" 880. Since the equivalence identifiers for the regions R0 910 and R1 911 match, the new region R1 911 is added (as at step 1130) to the super region.

Returning to FIG. 10, as at step 1015, to get the next region, the variable ComparisonRegion is incremented. In the example of FIGS. 9A, 9B and 9C, the variable ComparisonRegion is incremented to point to the region R2 912. The value of the variable ComparisonRegion passes the end of list check (as at 1020), and the 'already in super region' check (as at step 1025), so the two regions, R0 910 and R2 912 are compared for equivalent compositing stacks (as at step 1030). The StackIndex values from both R0 910 and R2 912 (StackIndex 932=0, StackIndex 940=1) are used as indexes into the compositing stack table 827 (as at step 1120). The region R0 910 has an equivalence identifier "A" 880 while the region R2 912 has an equivalence identifier "C" 881. The two regions R0 910 and R2 912 then fail the test at step 1125 as the regions R0 910 and R2 912 do not have the same equivalence identifiers, and region R2 912 is not appended to the super region. A similar equivalence identifier check is then made between regions R0 910 and R3 913, which also fails the equivalence test (as at step 1125) as the two regions R0 910 and R3 913 do not have the same equivalence identifiers. The same equivalence identifier check between regions R0 910 and R4 914 results in the same equivalence identifier, since the StackIndex 932 and 944 in the two regions R0 910 and R4 914 point to the same equivalence identifier "A". Since the equivalence identifiers for the regions R0 910 and R4 914 match, the new region R4 914 is added (as at step 1130) to the super region.

Returning to FIG. 10, at step 1020, it is established under execution of the processors 170 that there are no more regions for comparison with region R0 910, and so at step 1050 the next region is selected. The method 1000 continues in like manner, building up the complete super region list until all regions of the image are compared with all other regions of the image.

Once the super regions have been formed for an image, as expressed in the super region data structures, SuperRegionData, the super regions are then copied to the GPU of the processors 170, along with the compositing stack data for fillmap representing the image. The processors 170 then use fill compositing stacks to render pixel data for the image to an output buffer.

One kernel is allocated to render each super region. The data has been arranged such that all the pixels in the super region share an equivalent compositing stack. All threads in the kernel process the same level operations (e.g. Porter and Duff Over) and operands (e.g. image, flat colour) in the same order. The threads may only differ by operand, such as particular colours or a particular bitmap (e.g. green for a flat fill). Therefore, rendering may be performed by launching a GPU kernel for a particular instruction defined by the equivalent compositing stack associated with regions in the super region. Each thread within the launched kernel processes a single pixel (or multiple pixels depending on a particular implementation). Each thread follows the same instructions by taking different operand data as an input (particular bitmaps, colours etc.). As a result, a significant performance advantage is gained, as there will be no GPU instruction divergence cost.

As such, a CPU may send a request to a GPU to launch a graphics processing kernel (GPU kernel) for rendering pixels of the super region in parallel. The GPU kernel defines a set of instructions to be executed by each parallel thread on the GPU in a way that all threads execute the same instructions to minimise instruction divergence. The pixels in the super region are rendered in parallel by parallel threads of the GPU using instructions defined by the graphics processing kernel. Each thread can render a pixel or a subset of pixels of the super region.

Figure 20:
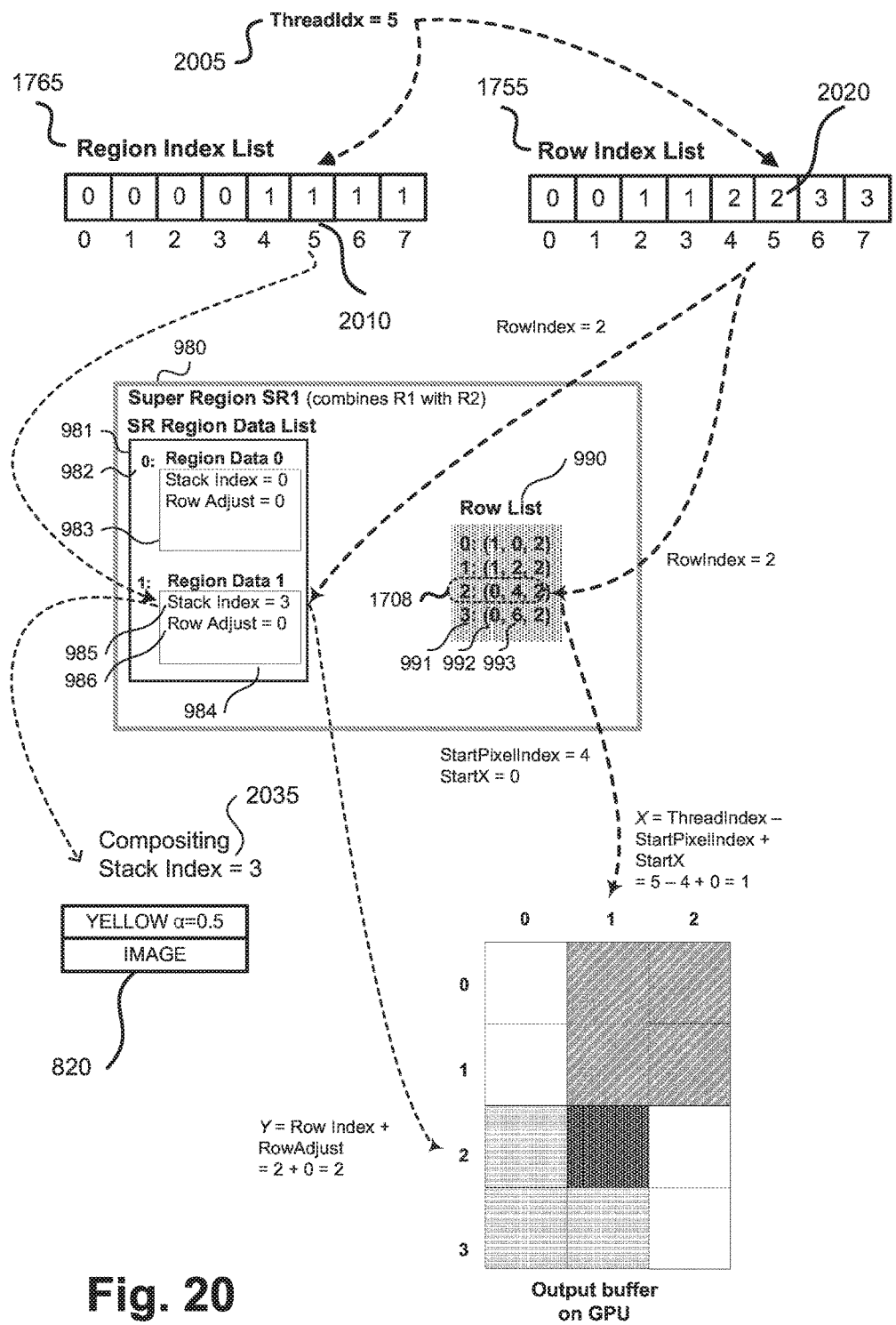
FIG. 20 shows an example of rendering a pixel in a super region.

As will be described in further detail below with reference to FIG. 20, the thread takes its own address and indexes into the row index list. The resulting value is used to index into the super region row list. The row list for the super region is combined with the row index list to determine the x coordinate of the rendered pixel in the output buffer. Then the calculated row index list value is combined with the regional RowAdjust value for the super region to determine the y coordinate of the rendered pixel in the output buffer. Finally, the regional StackIndex value for the super region combined with the region index list supplies the correct compositing stack for writing out each pixel.

Figure 17A:
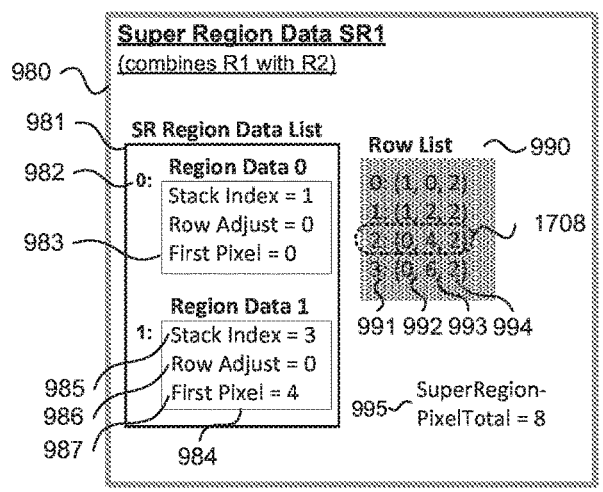
FIG. 17A shows an example of a super region data structure for the super region shown in FIG. 17B.
Figure 17B:
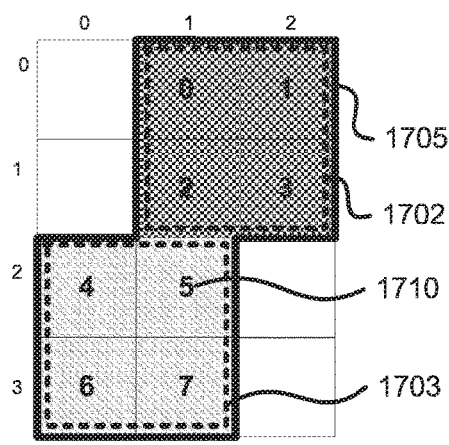
FIG. 17B shows an example of a fillmap tile including regions and a super region.
Figure 17C:
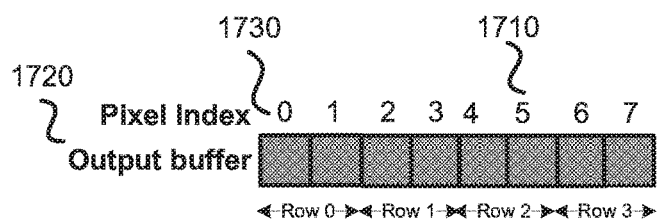
FIG. 17C shows an output buffer for the super region in 17B.
Figure 17D:
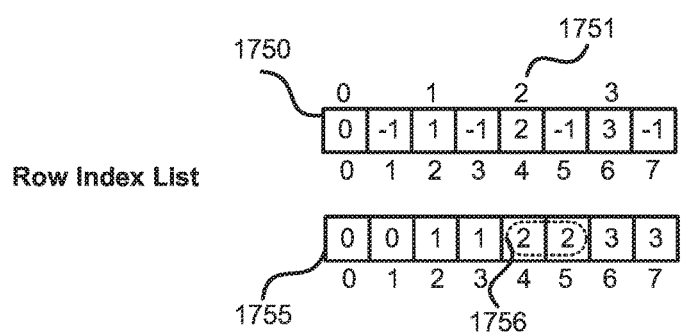
FIG. 17D shows a row index list as used in the rendering of a super region of 17A.
Figure 17E:
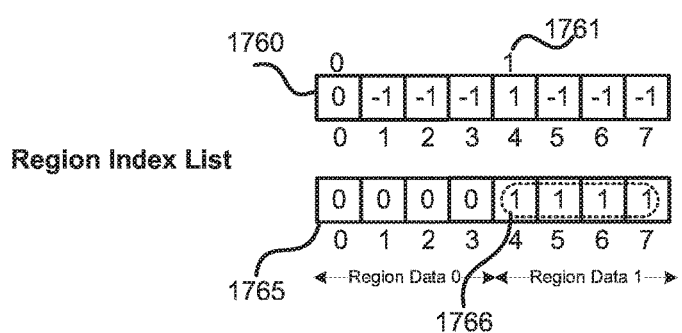
FIG. 17E shows a region index list as used in the rendering of a super region of 17A.

FIGS. 17A-E show data structures used in rendering super regions. FIG. 17A shows an example of an incoming super region data structure 980 for each super region. From the super region data structure 980, a region index list, RegionIndexList, 1760, as seen in FIG. 17E, is constructed using the region data inside the super region data structure 980. The region index list 1760 is used during rendering to map a pixel of the thread to the region within the super region.

Then, a row index list, RowIndexList, 1751, as seen in FIG. 17D, is constructed using the row data inside the super region data structure 980. The row index list 1751 is used during rendering to map a pixel of a thread to the row within the super region.

The region index list, RegionIndexList, 1760, and row index list, RowIndexList, 1751, together with the super region data structure 980, are then used to update the pixel locations of the super region in the output buffer 1720. Rendering is complete when the output buffer 1720 is copied back to the processors 170.

Returning to FIG. 6, having formed super regions in step 620, the method 600 proceeds to rendering step 640. At step 640, the super regions formed at step 620 are rendered. A method 1400 of rendering super regions of a fillmap tile, using pixel-parallel rendering, as executed at step 640, will now be described in detail with reference to FIG. 14. The method 1400 will be described by way of example with reference to FIGS. 15 to 18. The method 1400 may be implemented as one or more software code modules of the controlling program 181 resident in the memory 190. The method 1400 will be described by way of example where the program is controlled in its execution using a combination of CPU 171 and GPU 172 of the controller processors 170.

The method 1400 begins at a first copying step 1410, where super region data contained in the data structure, SuperRegionData 980 stored on memory 148 of the CPU 171, is copied to the memory 330 of the GPU 172, under execution of the controller processors 170. FIG. 17A shows data structure, SuperRegionData 980, stored on the GPU 172, where the data structure is copied from the data structure 980 without the unused SuperRegion-NextRow and SuperRegion-RowDelta.

The method 1400 proceeds to a second copying step 1420, where the compositing stack data 827 for the super region is copied to the GPU memory 330, under execution of the controller processors 170.

The method 1400 then proceeds to a first preparing step 1430 where a row index list required for pixel-parallel rendering of a super region is prepared on the GPU 172. The row index list is used during rendering to calculate the pixel location within the output buffer configured within the memory 190. A method 1500 of preparing a row index list for later rendering of a super region, as executed at step 1430, will be described in detail below with reference to FIG. 15.

The method 1400 then proceeds to a second preparing step 1440 where the region index list required for pixel-parallel rendering of a super region is prepared on the GPU 172. A method 1600 of preparing a region index list for rendering of a super region, as executed at step 1440, will be described in detail below with reference to FIG. 16.

Upon completion of the step 1440, the method 1400 proceeds to rendering step 1450 where the super region is rendered to an output buffer 1720 on the GPU 172, as shown for example in FIG. 17C. Pixels of the super region are rendered to the output buffer 1720 using the super region data, and the index lists. A method 1800 of rendering a super region, as executed at step 1450, will be described in detail below with reference to FIG. 18. In FIG. 17C the indices of the elements of the output buffers correspond to pixel enumerations 1730. For example, pixel 1710 at co-ordinate (1, 2) in a fillmap tile 1705 in FIG. 17B corresponds to pixel 1710 with index five (5) in output buffer 1750 as shown in FIG. 17C. That is, if all pixel runs of the super region are arranged in a sequence starting from the first line of that super region, the position of each pixel in that sequence can be considered as a pixel index.

The CPU 171 launches calls to the GPU rendering functions at rendering step 1450 which are executed on the GPU 172, and the CPU 171 can continue executing other instructions while the GPU 172 is rendering. Upon completion of the rendering on the GPU 172, the rendered pixels in the output buffer 1720 are on the GPU memory 330 of the GPU 172. Upon completion of the step 1450, the method 1400 proceeds to the copying step 1460, where the rendered pixels in the output buffer 1720 on the GPU 172 are copied (or transferred) back to the CPU 171 of the processors 170.

Each super region is used to create two lists (the row index list and region index lists) to assist in enabling pixel rendering in a parallel environment. First the row index data is generated, where the row index data is used during rendering to map a pixel of a thread to the row within the super region, and from there establish the x location of the pixel in the output buffer. The region index list is used for mapping the thread index to the region (inside the super region) including the pixel of the thread, and from there establish the compositing stack of the pixel for rendering.

The region index list also contributes to calculating the y location for the pixel in the output buffer.

Figure 15:
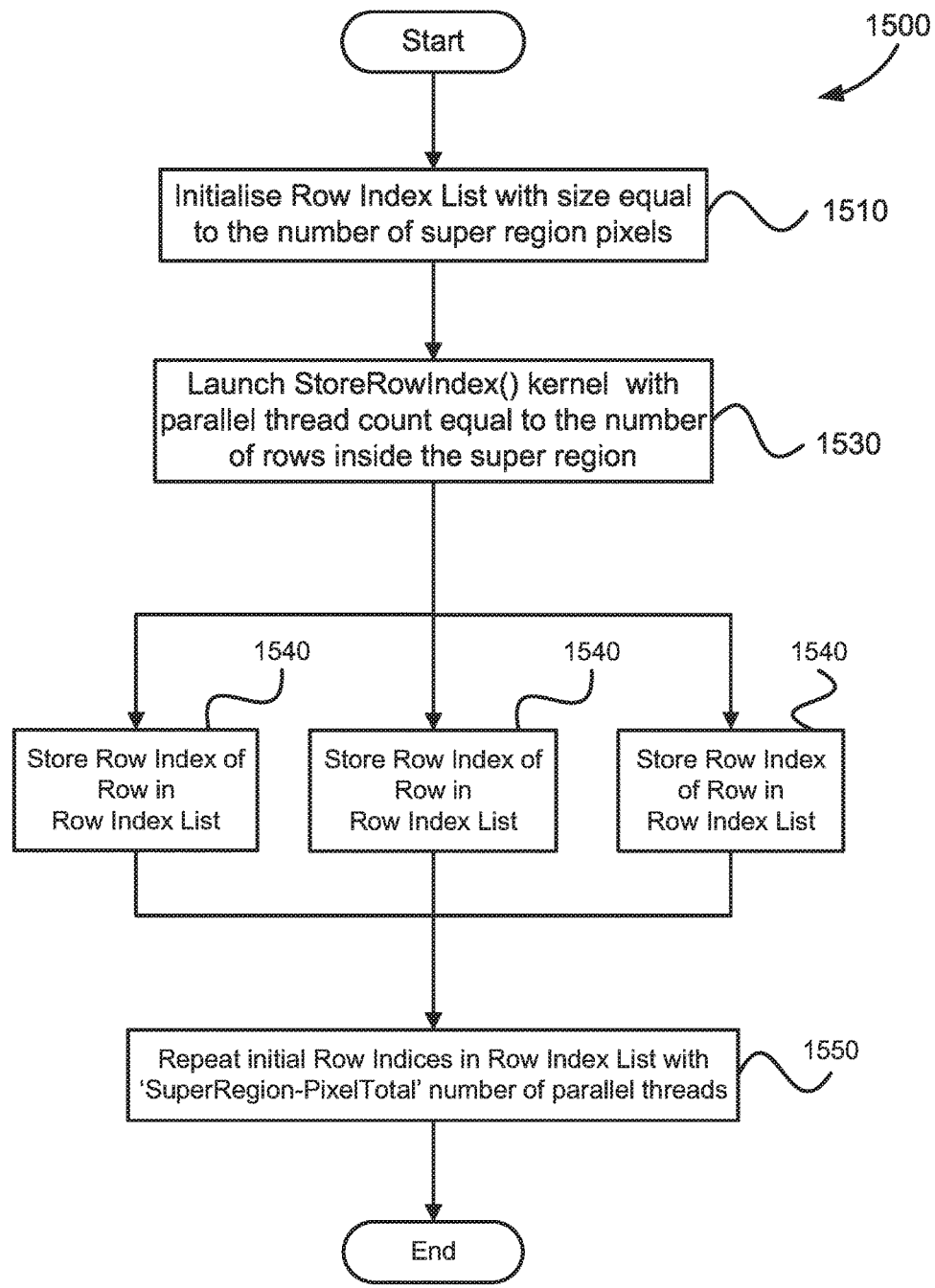
FIG. 15 is a schematic flow diagram showing a method of preparing a row index list for rendering of a super region.

The method 1500 of preparing a row index list on the GPU 172 for later rendering of a super region, as executed at step 1430, will now be described with reference to FIG. 15 and FIG. 17. The method 1500 may be implemented as one or more software code modules of the controlling program 181 resident in the memory 190 and being controlled in its execution using a combination of the CPU 171 and GPU 172 of the controller processors 170.

The method 1500 is used for preparing a row index list using a plurality of threads. Within the GPU 172, one thread is being used to process each pixel. As the number of pixels in each row of a super region may not be same, or the leftmost pixel x-coordinate in each row of a super region may vary, it is not trivial to map the parallel thread indices to the corresponding pixel coordinates in the region in an SIMD programming model in a general purpose GPU (GPGPU) environment.

The method 1500 determines a relationship between the pixels in a super region and the threads that process the pixels in the super region. As described below, a reference is created for at least one of the threads rendering a pixel on a row of a determined super region to another of the threads rendering the first pixel on the row.

Figure 14:
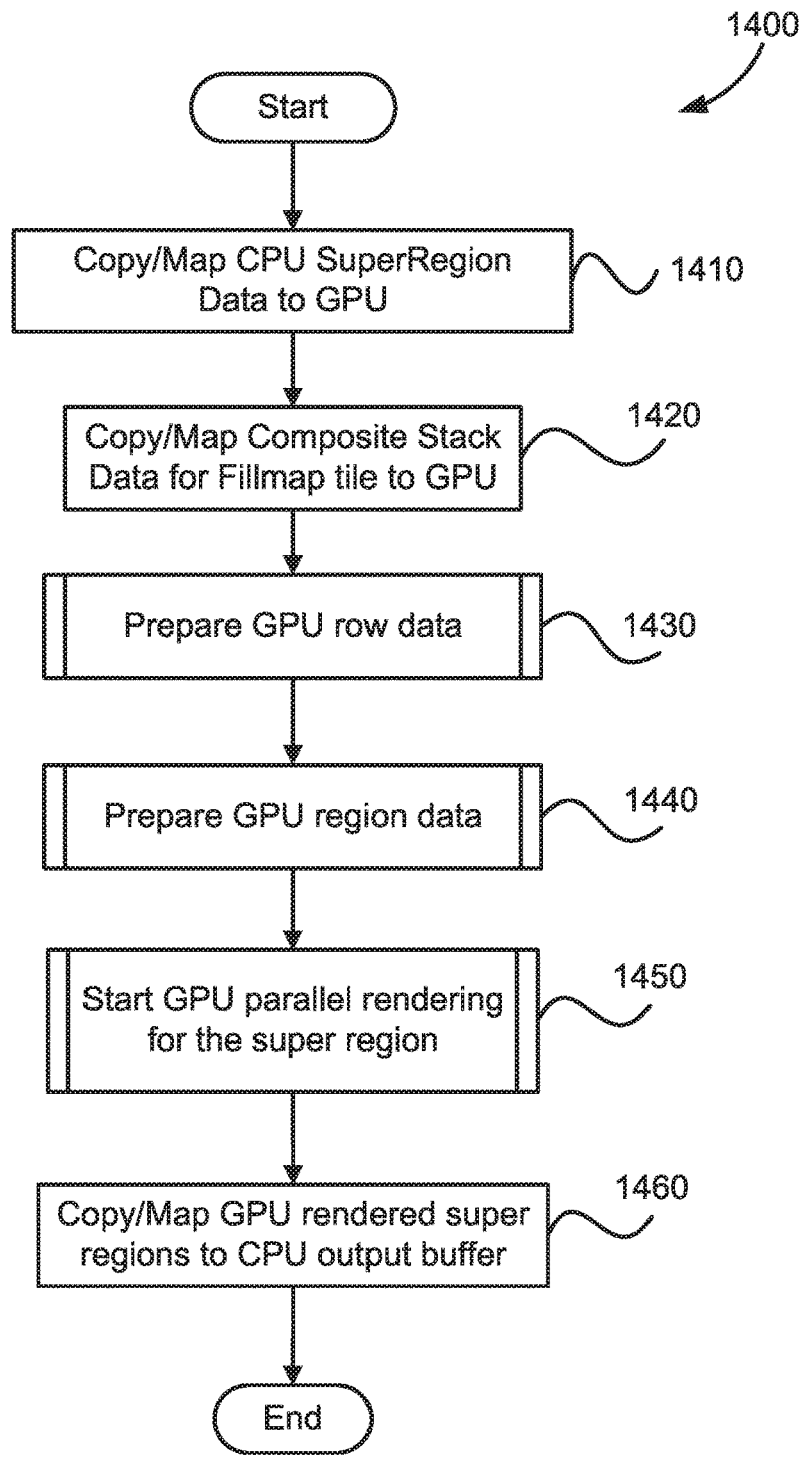
FIG. 14 is a schematic flow diagram showing a method of rendering super regions.

As described in step 1410 of FIG. 14 and the example in FIG. 9C, the data, SuperRegionData 980, that is copied to the GPU 172 comprises a set of super region global variables, such as SuperRegion-RegionDataList, RowList and SuperRegion-PixelTotal. The size of the RowList of the super region is the total number of rows in the super region.

The method 1500 begins at initialising step 1510, where a list, row index list 1750, is created with a number of elements equal to the number of pixels SuperRegion-PixelTotal 995 in the super region data structure, SuperRegionData 980. The value of each element is assigned to a row (i.e., a row index into the RowList of the super region). Each element of row index list is initialised with negative one (−1). The initialised elements are needed later during the later prefix scan max operation.

For a thread rendering a pixel, a corresponding row (or scan line) to place the rendered pixel is determined using a row index list data structure row index list indexed by a thread identifier in the form of a thread index. The purpose of the row index list 1750 is to determine a mapping between a thread index, an associated rendered pixel index and the super region row (in the row index list) to which the pixel belongs. A thread with an index can use the row index list to get the associated super region row index. The row index list may be further used obtain the value of the variable, RowInfo, which contains all the data for that row (e.g. 1708. The variable, RowInfo, may be used to determine the output buffer pixel y coordinate.

Processing then proceeds from step 1510 to launching step 1530, where a GPU kernel, StoreRowIndex( ) is launched, under execution of the CPU 171 of the processors 170. The GPU kernel, StoreRowIndex( ) is launched at step 1510 with a number of threads equal to the number of rows inside the super region (i.e. the size of the RowList 990 for the super region is inside the SuperRegionData data structure 980). Each thread, one per row, is used for writing one value into the row index list. The launching of a kernel at step 1530 allows the kernel defined on the GPU 172 to be executed with a number of threads equal to the number of rows in the super region. If the number of threads (or rows) is less than or equal to the number of GPU cores or processing elements 310 and 320, the threads are running in parallel. Otherwise, groups of threads are sequentially scheduled by the scheduler on GPU 340 and executed concurrently. However, threads within any one group are executed in parallel where, the term "in parallel" refers to both threads being executed "in parallel" and threads being executed "concurrently".

Processing proceeds to storing step 1540, where each thread sets one index 991 for a row into the list, row index list 1750, at a position indicated by the StartPixelIndex 993 of the row. Step 1540 is executed by a GPU kernel, StoreRowIndex( ) with a number of threads being specified by the row count in SuperRegionData 980.

Pseudocode for the StoreRowIndex( ) kernel is as follows:

```
RowIndex = ThreadIndex
RowInfo = RowList[ RowIndex ]
RowIndexList[ RowInfo.StartPixelIndex ] = RowIndex
```

The variable RowIndex is set to equal ThreadIndex 1752, and then RowIndex is then used to index into RowList 990 for the super region, returning row information as RowInfo 1708. StartPixelIndex 993 of the row is then obtained from RowInfo, which is then used as the position inside RowIndexList 1750 for placing the value RowIndex. Each thread in the GPU kernel sets one row index value into the row index list 1750, with each thread index corresponding to a row index.

Upon completion of step 1540 for all threads, the method 1500 proceeds to repeating step 1550 to repeat the row indices in the list, RowIindexList, so as to initialise as yet uninitialised elements (i.e. those elements filled with −1) with the row index to the left of the uninitialised elements. The resultant populated list, row index list 1755, is shown in FIG. 17D. Step 1550 may be implemented with a parallel scan-max method, for example, where SuperRegion-PixelTotal 995 threads are executed in parallel on the GPU 172.

The method 1500 of preparing a row index list for later rendering of a super region, as executed at step 1430, will now be described in further detail with reference to FIGS. 17A-17E. FIG. 17B shows a super region 1705. The super region 1705 comprises two regions 1702 and 1703. The two regions 1702 and 1703 are labelled as Region Data 0 and Region Data 1, respectively, in super region SuperRegion1 980 in FIG. 17A. According to the methods described above, the SuperRegionData structure 980 contains data to prepare the row index list for rendering.

A list, row index list 1750, is created, as at step 1510, with a number of elements equal to the number of pixels in the super region. The number of pixels is obtained from a variable, SuperRegion-PixelTotal 995, in the data, SuperRegionData 980. In the example of FIG. 17A, the count is eight (8) pixels. Each element of the list, row index list, is initialised with −1.

Processing then proceeds to launching step 1530, where a GPU kernel, StoreRowIndex( ), is executed with a number of threads equal to the number of rows in the super region (i.e., the size of the RowList 990 (value=4) inside the SuperRegionData structure 980 for the super region.

In the method 1500, processing proceeds to storing step 1540 where the Row Indices 991 of the RowList 990 are stored in the list, row index list 1750, at positions according to StartPixelIndex 993 inside each row of the RowList 990. Each thread in the GPU kernel sets one row index value into the row index list 1750, with each thread index corresponding to a row index. In the example of FIG. 17A, thread 2 corresponds to RowList 990 row 2 1708. The thread will place the index value 2 (from Row Indices 991) at the Row Index List 1750 location given by the start pixel index value=4 (993) for the row, as shown at 1751. The other three threads corresponding to the three rows will similarly update the Row Index List, resulting in the content shown in 1750.

Using an inclusive scan (also referred to as prefix sum) with "max" operator (which sets each element of a list to the maximum value of all elements up to and including the current element), step 1550 then repeats the row indices in the list, row index list, so as to initialise undefined elements (initially filled with −1) with the row index to their left. The resultant list, row index list 1755, is shown in FIG. 17D.

The method 1600 of preparing a region index list for rendering a super region, as executed at step 1440, will now be described with reference to FIG. 16. The method 1600 may be implemented as one or more software code modules of the controlling program 181 resident in the memory 190 and being controlled in its execution using a combination of the CPU 171 and GPU 172 of the controller processors 170. The region list data is used during rendering to map region data to each rendering thread.

For a thread rendering a pixel, the region to which the pixel belongs is determined by indexing the region index list 1760 data structure by a thread identifier in the form of a thread index. The purpose of the region index list is to determine a mapping between a thread index, an associated rendered pixel index and the region (in the region index list) to which the pixel belongs. A thread can use the region index list to get the associated region index inside the super region, and from that, to obtain compositing information for rendering.

Figure 16:
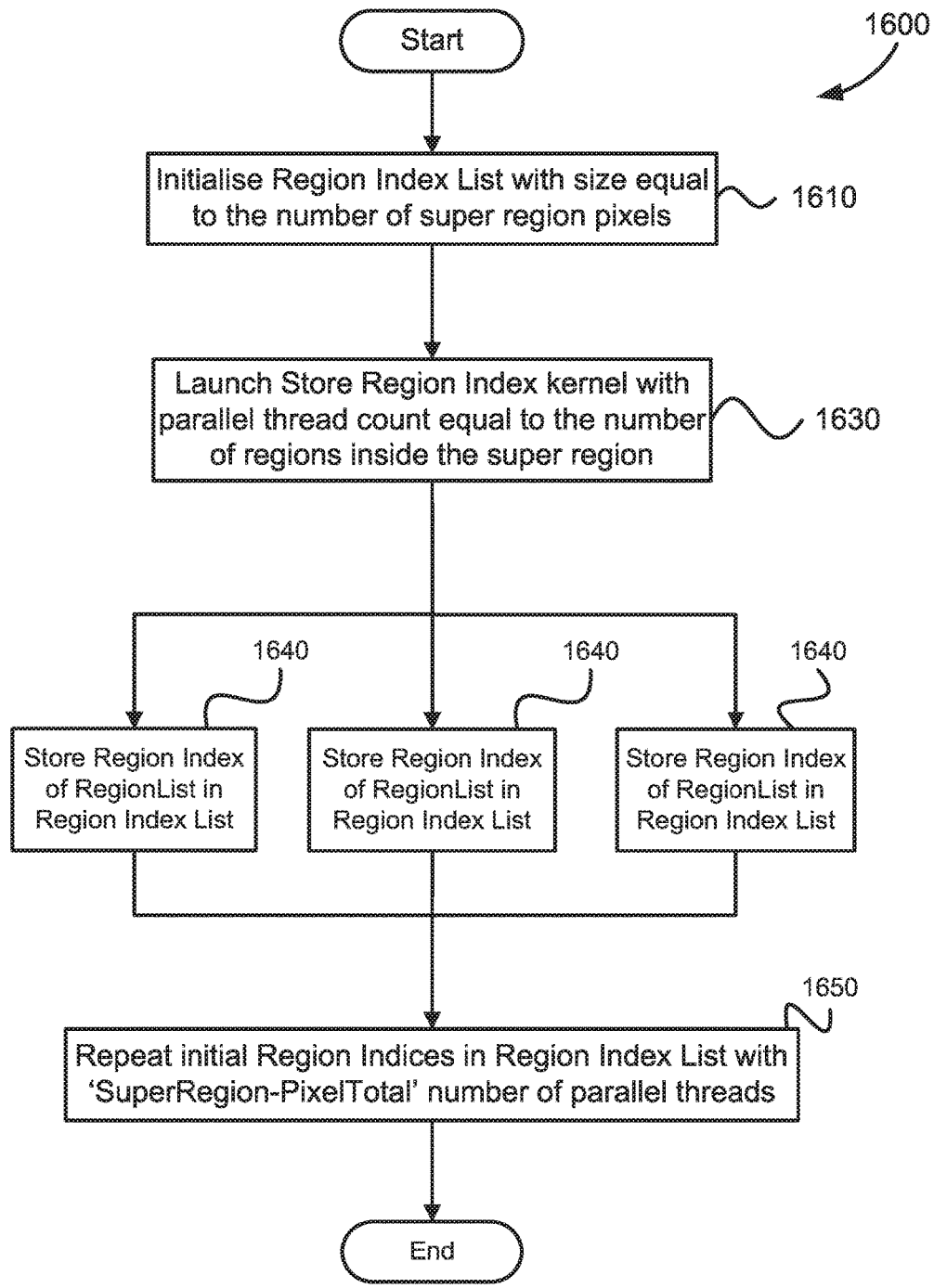
FIG. 16 is a schematic flow diagram showing a method of preparing a region index list for rendering a super region.

The method 1600 of preparing the region index list required for rendering a super region as shown in FIG. 16 starts with initialising step 1610 where a list, region index list 1760, is created with a number of elements equal to the number of pixels in the super region on the GPU 172. The number of pixels is obtained from a super region variable, SuperRegion-PixelTotal 995. Each element of the list, region index list, is initialised with −1.

Processing then proceeds to launching step 1630, where a GPU kernel StoreRegionIndex( ) is executed with a number of threads equal to the size of the SuperRegion-RegionDataList 981 (i.e., to the number of regions inside the super region).

Processing proceeds to storing step 1640 where the indices of the SuperRegion-RegionDataList 981 are set into the list, region index list 1750, at positions according to the First Pixel value 987 of each region in the SuperRegion-Region-DataList 981. Step 1640 is executed by a GPU kernel, StoreRegionIndex( ) including a number of threads equal to the number of regions inside the super region. Each thread sets a region index in the list, RegionIindexList, at a position indicated by the FirstPixel index of the corresponding region. Each thread index corresponds to a region index.

Pseudocode of the StoreRegionIndex( ) kernel is as follows:

```
RegionIndex = ThreadIndex
RegionData = SuperRegion−RegionDataList [ RegionIndex ]
RegionIndexList[ FirstPixel in RegionData ] = RegionIndex
```

The variable RegionIndex is set to equal ThreadIndex, and then RegionIndex is used to index into SuperRegion-RegionDataList 981, returning an instance of SuperRegion-RegionData 983. FirstPixel 987 is then obtained from the region data, which is then used as the position inside region index list 1760 to place the value RegionIndex.

Upon completion of the step 1640 for all threads, the method 1600 moves to repeating step 1650 to repeat the region indices in the list, region index list 1760, so as to initialise undefined elements (initially filled with −1) with the region index to their left. The resultant list, region index list 1765, is shown in FIG. 17E. Step 1650 can be implemented with a parallel scan-max method, where SuperRegion-PixelTotal 995 threads are executed in parallel on the GPU 172.

The method 1600 will be further described in further detail with reference to FIGS. 17A-17E. FIG. 17B shows the super region 1705, comprising the two regions 1702 and 1703. As described above, the SuperRegionData structure 980 describes the super region.

A list, region index list 1760, is created, as at step 1610, with a number of elements equal to the number of pixels in the super region. The number of pixels is obtained from a variable, SuperRegion-PixelTotal 995, in the data, SuperRegionData 980. In the example of FIG. 17A, the count is eight (8) pixels. Each element of the list, region index list, is initialised with −1.

A GPU kernel, StoreRegionIndex( ) is launched, as at step 1630, with a number of threads equal to the number of regions inside the super region (i.e. the size of the SuperRegion-RegionDataList 981 value=2).

The region indices 982 of the list, SuperRegion-Region-DataList 981 are stored in the list, region index list 1760, at positions according to the FirstPixel indices of each member of SuperRegion-RegionDataList 981, as at step 1640. Each thread sets a region index in the list, region index list 1760, at a position indicated by the FirstPixel index of each region. Each thread index corresponds to a region index. In the example, thread 1 corresponds to RegionData instance 984, having FirstPixel value 987 of four (4). The thread will place the index value 1 at the region index list 1760 location given by the FirstPixel value of 4 987 of the region, as shown in 1761. The other thread corresponding to the other region will similarly update the region index list 1760, resulting in the content shown in 1765.

Using an inclusive scan with "max" operator (which sets each element of a list to the maximum value of all elements up to and including the current element), step 1650 then repeats the row indices in the list, region index list 1760, so as to initialise undefined elements (initially filled with −1) with the region index to their left. The resultant list, region index list 1765, is shown in FIG. 17E.

Once the super regions and the constituent compositing stack data have been created and transferred to the GPU, then the super regions are used to render the super region pixels to the output buffer, one thread per pixel.

Figure 18:
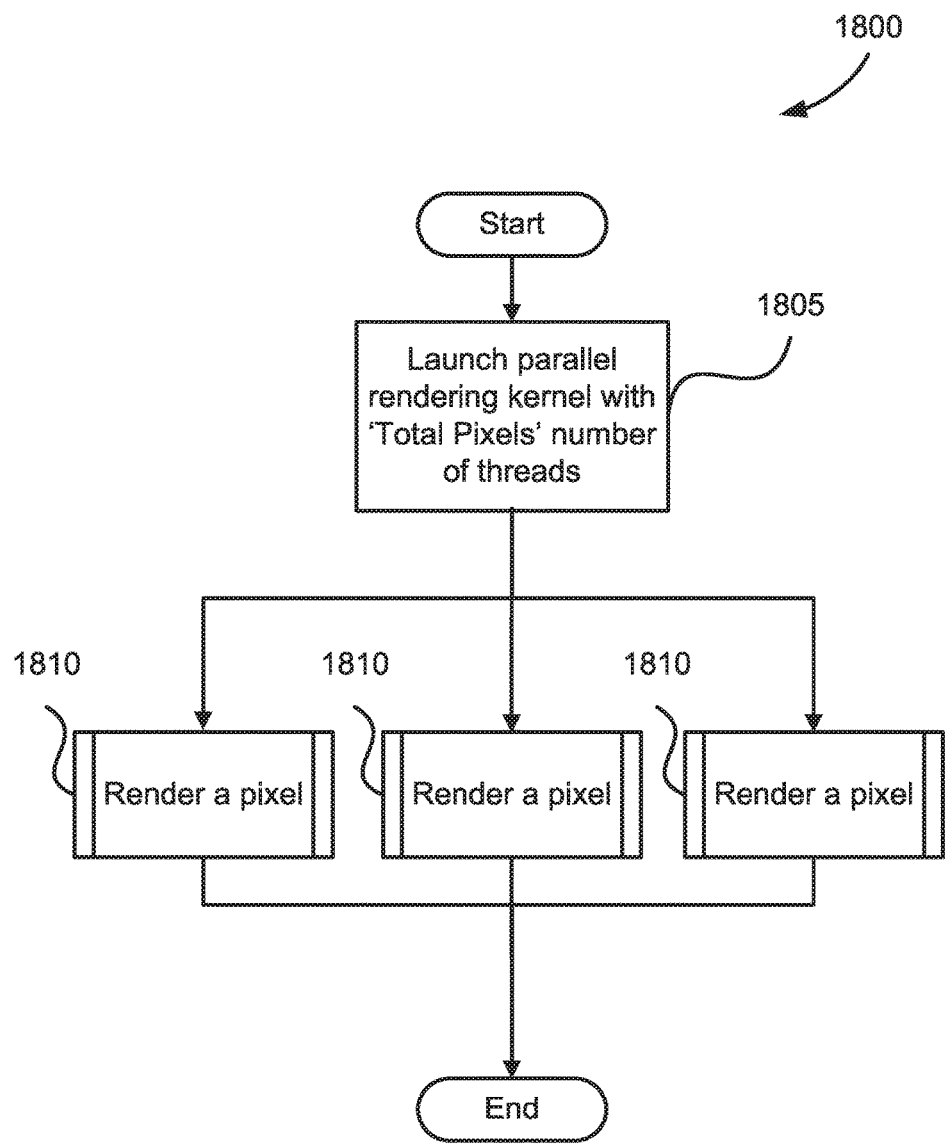
FIG. 18 is a schematic flow diagram showing a method of rendering a super region in a fillmap tile.
Figure 19:
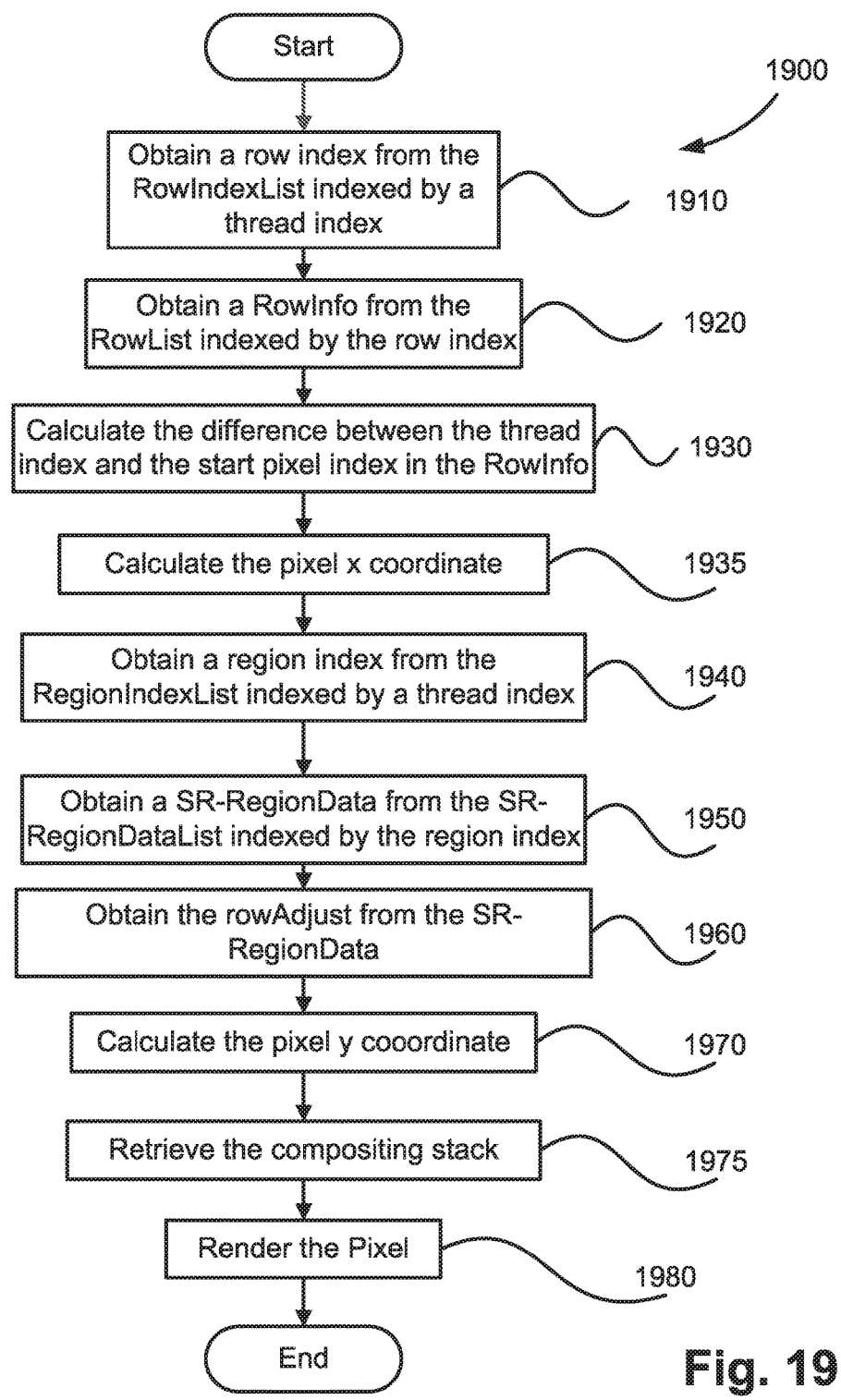
FIG. 19 is a schematic flow diagram showing a method of rendering a pixel.

Returning to FIG. 14, upon completion of step 1440, step 1450 now executes the parallel rendering for the super region, according to the method 1800 shown in FIG. 18. The method 1800 may be implemented as one or more software code modules of the controlling program 181 resident in the memory 190 and being controlled in its execution using a combination of the CPU 171 and GPU 172 of the controller processors 170. The method 1800 starts at launching step 1805, where a GPU kernel is launched with a SuperRegion-PixelTotal 995 number of threads in parallel. The method 1800 then proceeds to a parallel step 1810 where each thread renders a pixel at a position and with a compositing stack determined using the super region data and two index lists. A method 1900 of rendering a pixel, as executed at step 1810, will be described in detail below with reference to FIG. 19. Each thread performs the method 1900 in parallel with other render threads, as shown in FIG. 19. Since all threads in the kernel process pixels sharing equivalent compositing stacks, every thread in the kernel processes the same level operations and operand types. As a result, a significant performance advantage is gained, as there will be no GPU instruction divergence cost.

The method 1900 may be implemented as one or more software code modules of the controlling program 181 resident in the memory 190 and being controlled in its execution using a combination of the CPU 171 and GPU 172 of the controller processors 170. The method 1900 starts with obtaining step 1910, where a row index, RowIndex, is obtained from the list, row index list 1755, indexed by the thread index, ThreadIndex as follows:

RowIndex=RowIindexList[ThreadIndex]

RowIndex is an index into the super region's RowList 990. The index, RowIndex, may be different from an index of a scanline of a region. The actual index of the scanline (or y-coordinate) of the pixel in the super region is the RowIndex plus the offset value of the region variable, RowAdjust 986. In the example super region 1705, as seen in FIG. 17B, the row index to RowList and the scanline index to the tile are the same because the offset value of the variable, RowAdjust 986, is zero.

Processing proceeds to obtaining step 1920, where a RowInfo 1708 for a row in the RowList 990 for the super region indexed by the index RowIndex 1756 is selected as follows:

RowInfo=RowList[RowIndex]

The RowInfo has a variable, StartX 992, for the selected row and a start pixel index, StartPixelIndex 993 for the first pixel of the row. The variable, StartX, is the x-coordinate of the first pixel in the selected row while the index, StartPixelIndex 993, indicates the corresponding index (for the first pixel in a row) to the list, row index list. For example, the start x-coordinate for row index equal to one (1) is one (1) and the start pixel index is two (2). The element at index 2 in the row index list has a value 1, indicating row 1 in the RowList for the super region. The start x-coordinate, StartX 992, and the start pixel index, StartPixelIndex 993, are used to determine the x-coordinate of the pixel to be rendered by a thread identified by index, ThreadIndex.

Then, processing proceeds to step 1930, where the difference between the ThreadIndex (or pixel index) and the StartPixelIndex 993 is determined as DeltaX, as follows:

DeltaX=ThreadIndex−RowInfo·StartPixelIndex

The difference between the ThreadIndex variable and the StartPixelIndex 993 variable indicates the number of pixels between the current rendered pixel and the first pixel in the selected row.

Processing of the method 1900 proceeds to determining step 1935, where the pixel x-coordinate is determined. The x-coordinate equals the value of the variable, DeltaX plus the value of the variable, StartX 992, of the selected row as follows:

x=DeltaX+RowInfo·StartX

Then, the method 1900 proceeds to obtaining step 1940, wherein the region index is retrieved for each pixel for each thread. In a similar manner to obtaining a row from row index list, a region index, RegionIndex, is obtained from the list, region index list, indexed by the thread index, ThreadIndex as follows:

RegionIndex=region index list[ThreadIndex]

RegionIndex is an index to the SuperRegion-RegionDataList data structure 981.

The method 1900 then proceeds to obtaining step 1950, where an instance RegionData of SuperRegion-RegionData 983 is selected, indexed by the index, RegionIndex 1766, into the list, SuperRegion-RegionDataList 981 as follows:

RegionData=SuperRegion-RegionDataList[RegionIndex]

At obtaining step 1960, the SuperRegion-RegionData variable RowAdjust 986 is retrieved under execution of the processors 170. RowAdjust is used to map between the rows in the row list of the super region and actual scanline rows in the regions (i.e. the y-coordinate of the row).

The method 1900 then proceeds to a determining step 1970, where the pixel y-coordinate is determined. The y-coordinate is equal to the value of the variable, RowIndex, plus the value of the variable, RowAdjust, of the region as follows:

y=RowIndex+region's RowAdjust

At retrieving step 1975, the SuperRegion-RegionData variable StackIndex 985 is retrieved under execution of the processor 170. The retrieved SuperRegion-RegionData variable is then used to index into the Compositing Stack Table 827 to retrieve the compositing stack for the pixel.

Then at rendering step 1980, the pixel at the determined position (x,y) is rendered using the retrieved compositing details. Upon completion of step 1980, the method 1900 concludes. Every thread within each super region is rendering a compositing stack level sequence with the same operations and operand types. The thread retrieves the operand data specific to the compositing stack of the pixel associated with the thread, but no instruction divergence occurs. Retrieving the operand data specific to the compositing stack of the pixel associated with the thread is a very desirable outcome for GPUs, which dramatically loses efficiency under instruction divergence since stalled threads need to wait for all other threads in their warp.

The method 1800 of rendering a super region, as executed at step 1450, will be described in further detail by way of example with reference to Fig. FIG. 20. Following on from the sample in FIGS. 17A-17E, a region index list 1765, row index list 1755, and SuperRegionData instance 980 are shown. In the example of FIG. 20, thread 5 (2005) is used to render pixel 5 (1710) inside the GPU kernel.

As at obtaining step 1910, a row index, RowIndex 2020, is obtained from the list, row index list 1755, indexed by the thread index, ThreadIndex as follows:

RowIndex=RowIndexList[ThreadIndex]=RowIindexList[5]=2

Then as at obtaining step 1920, a RowInfo 1708 for the row indexed by the index RowIndex (equal to 2 (2020)) into the RowList 990 for the super region is selected as follows:

RowInfo=RowList[RowIndex]=RowList[2]=(0,4,2)

The RowInfo 1708 for the row has a StartX 992 (i.e. the region start x-coordinate for this row) equal to 0, and StartPixelIndex 993 (i.e. the pixel number within the super region) equal to four (4). Then, as at step 1930, the difference between the ThreadIndex and the StartPixelIndex 993 is determined as DeltaX, as follows:

DeltaX=ThreadIndex−RowInfo·StartPixelIndex=5−4=1

Then as at a determining step 1935, the pixel x coordinate is determined. The x-coordinate equals the value of the variable DeltaX plus the value of the variable StartX of the selected row:

$x = \text{Delta}X + \text{RowInfo} \cdot \text{Start}X = 1 + 0 = 1$

Then, as at step 1940, the region index is retrieved for each pixel of each thread. The region index is used to determine the output buffer y value together with the relevant compositing stack. In a similar manner to row determination, a region index, RegionIndex, is obtained from the region index list 1765 region index list indexed by the thread index 5, ThreadIndex, as follows:

RegionIndex=region index list[5]=1

As at obtaining step 1950, an instance of SuperRegion-RegionData 983 is selected, indexed by the region index 2 calculated in the previous step, into the list SuperRegion-RegionDataList 981:

SuperRegion-RegionData=SuperRegion-RegionDataList [1]

As at obtaining step 1960, the SuperRegion-RegionData variable RowAdjust 986 is retrieved as value 0 (986). Then as at step 1970, the y-coordinate is equal to the value of the variable RowIndex (2) plus the value of the variable RowAdjust (0) of the region as follows:

$y = \text{RowIndex} + \text{SuperRegion-RegionData} \cdot \text{RowAdjust} = 2 + 0 = 2$ The SuperRegion-RegionData variable StackIndex 985 is retrieved as value=three (3), as at step 1975. The value of the SuperRegion-RegionData variable StackIndex 985 is then used to index 2035 into the Compositing Stack Table 827 to retrieve the compositing stack for the pixel as at step 820. The pixel at the calculated position (1,2) is rendered, as at step 820, using the retrieved compositing details 820 (i.e., at pixel coordinates (1,2) a colour from the image at the first level is obtained then composited with a flat colour, yellow, with the operation Porter and Duff Over).

Threads 0 to 7 each render a pixel of the super region 1705 shown in FIG. 17B.

Returning to FIG. 14, with the pixel data now rendered, the rendered super region data is copied or mapped back to the CPU 171.

As described in relation to step 670, when all pixels in a region are rendered to the output buffer 1720 on the GPU 172, the output buffer 1720 is first copied to the CPU 171 as a compact super region output buffer and then each row of the super region is copied to a location in the output buffer of the tile on the CPU 171. When copying the rendered pixels from the compact super region output buffer 1720 to the output buffer on the CPU 171, pixels in each row are copied to the corresponding location calculated using the data, SuperRegionData 960 or 980, on the CPU 171. A block copy (e.g., memcpy( )) function may be used to copy a number of rendered pixels specified by the value of the Runlength 994 variable to location (x, y) in the output buffer on the CPU 171 of the tile.

INDUSTRIAL APPLICABILITY

The arrangements described are applicable to the computer and data processing industries and particularly for the image processing industry.

The foregoing describes only some embodiments of the present invention, and modifications and/or changes can be made thereto without departing from the scope and spirit of the invention, the embodiments being illustrative and not restrictive. Accordingly, although the description is directed primarily to region-based intermediate representations of images in the form of fillmaps having edges and fills, other region-based intermediate representations can also be processed using the disclosed super region rendering arrangements.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of rendering an image, the method comprising:
   receiving a plurality of regions of the image, each region being associated with a fill compositing stack comprising a plurality of levels to be composited to determine colour data of said region, each level being defined by a compositing operation and a colour operand, fill compositing stacks corresponding to the plurality of regions being stored in a compositing stack store;
   determining at least two equivalent fill compositing stacks in the compositing stack store, the at least two equivalent fill compositing stacks in the compositing stack store being defined by equivalent sets of compositing operations applied to different colour operands;
   selecting regions from the plurality of regions associated with the determined at least two equivalent fill compositing stacks;
   combining pixels of the selected regions into a data structure; and
   rendering pixels of the selected regions concurrently using the data structure to render the image.

2. The method according to claim 1, wherein the regions are generated from an intermediate graphical representation.

3. The method according to claim 1, the at least two fill compositing stacks are equivalent if the compositing stacks include the same compositing operation sequence and operand types.

4. The method according to claim 3, where operand type is at least one of flat colour, image, radial blend, two-point blend, three-point blend.

5. The method according to claim 1, further comprising combining region data for the selected regions into a super region.

6. The method according to claim 1, wherein region data for a selected region comprises one or more of a starting y coordinate, number of rows, a list of row information, total pixels of the selected region and associated index referring to a corresponding fill compositing stack.

7. The method according to claim 1, further comprising iterating the fill compositing stack for a pixel being rendered and executing operations specified in each level of the fill compositing stack.

8. The method according to claim 1, wherein the at least two fill compositing stacks are equivalent if the fill compositing stacks have the same number of stack levels.

9. The method according to claim 1, wherein the at least two fill compositing stacks are equivalent if the fill compositing stacks include the same type and order of compositing operations.

10. The method according to claim 1, wherein the at least two fill compositing stacks are equivalent if the fill compositing stacks include the same types and order of operands.

11. The method according to claim 1, wherein the at least two fill compositing stacks are equivalent if the fill compositing stacks include the same pre-post-processing functions.

12. A system for rendering an image, the system comprising:
- a memory for storing data and a computer program;
- a processor coupled to the memory for executing the computer program, the computer program comprising instructions for:
- receiving a plurality of regions of the image, each region being associated with a fill compositing stack comprising a plurality of levels to be composited to determine colour data of said region, each level being defined by a compositing operation and a colour operand, fill compositing stacks corresponding to the plurality of regions being stored in a compositing stack store;
- determining at least two equivalent fill compositing stacks in the compositing stack store, the at least two equivalent fill compositing stacks being defined by equivalent sets of compositing operations applied to different colour operands;
- selecting regions from the plurality of regions associated with the determined at least two equivalent fill compositing stacks;
- combining pixels of the selected regions into a data structure; and
- rendering pixels of the selected regions concurrently using the data structure to render the image.

13. An apparatus for rendering an image, the apparatus comprising:
- means for receiving a plurality of regions of the image, each region being associated with a fill compositing stack comprising a plurality of levels to be composited to determine colour data of said region, each level being defined by a compositing operation and a colour operand, fill compositing stacks corresponding to the plurality of regions being stored in a compositing stack store;
- means for determining at least two equivalent fill compositing stacks in the compositing stack store, the at least two equivalent fill compositing stacks being defined by equivalent sets of compositing operations applied to different colour operands;
- means for selecting regions of the plurality of regions associated with the at least two equivalent fill compositing stacks;
- means for combining pixels of the selected regions into a data structure; and
- means for rendering pixels of the selected regions concurrently using the data structure to render the image.

14. A non-transitory computer readable medium having a computer program recorded thereon for rendering an image, the program comprising:
- code for receiving a plurality of regions of the image, each region being associated with a fill compositing stack comprising a plurality of levels to be composited to determine colour data of said region, each level being defined by a compositing operation and a colour operand, fill compositing stacks corresponding to the plurality of regions being stored in a compositing stack store;
- code for determining at least two equivalent fill compositing stacks in the compositing stack store, the at least two equivalent fill compositing stacks being defined by equivalent sets of compositing operations applied to different colour operands;
- code for selecting regions from the plurality of regions associated with the at least two equivalent fill compositing stacks;
- code for combining pixels of the selected regions into a data structure; and
- code for rendering pixels of the selected regions concurrently using the data structure to render the image.

15. A method of rendering an image using a graphics processing unit, the method comprising:
- receiving a plurality of regions, each region being associated with a stack of colour generation operations, stacks of colour generation operations for the plurality of regions being stored in a stack store;
- determining at least two equivalent stacks of colour generation operations including in the stack store, wherein the at least two stacks are equivalent if the at least two stacks are defined by equivalent sets of graphical commands applied to different colour data;
- grouping regions associated with the determined at least two equivalent stacks of colour generation operations to be rendered in parallel by a graphics processing kernel launched on the graphics processing unit to process the grouped regions; and
- rendering pixels corresponding to the grouped regions by parallel threads of the graphics processing unit, the threads executing instructions defined by the graphics processing kernel.

16. The method according to claim 15, wherein the regions are generated from an intermediate graphical representation.

17. The method according to claim 15, wherein the at least two stacks are equivalent if the compositing stacks include the same compositing operation sequence and operand types.

18. The method according to claim 15, further comprising combining pixels corresponding to at least some of the grouped regions into a data structure.

19. The method according to claim 15, further comprising combining region data for the grouped regions.

20. The method according to claim 19, wherein the region data for a region comprises one or more of a starting y coordinate, number of rows, a list of row information, total pixels of the selected region and associated index referring to a corresponding compositing stack.

21. The method according to claim 15, further comprising iterating a compositing stack for a pixel being rendered and executing operations specified in each level of the compositing stack.

22. A system for rendering an image, the system comprising:
- a memory for storing data and a computer program;
- a processor coupled to the memory for executing the computer program, the computer program comprising instructions for:
- receiving a plurality of non-overlapping regions, each region being associated with a stack of colour generation operations, stacks of colour generation operations for the plurality of regions being stored in a stack store;
- determining at least two equivalent stacks of colour generation operations in the stack store, wherein the at least two stacks are equivalent if the at least two stacks are defined by equivalent sets of graphical commands applied to different colour data; and
- grouping regions associated with the determined at least two equivalent stacks of colour generation operations to be rendered in parallel by a graphics processing kernel launched on a graphics processing unit to process the grouped regions, wherein pixels corresponding to the grouped regions are rendered using parallel threads of the graphics processing unit, the threads executing instructions defined by the graphics processing kernel.

23. An apparatus for rendering an image using a graphics processing unit, the apparatus comprising:
  means for receiving a plurality of regions, each region being associated with a stack of colour generation operations, stacks of colour generation operations for the plurality of regions being stored in a stack store;
  means for determining at least two equivalent stacks of colour generation operations including in the stack store, wherein the at least two stacks are equivalent if the at least two stacks are defined by equivalent sets of graphical commands applied to different colour data;
  means for grouping regions associated with the determined at least two equivalent stacks of colour generation operations to be rendered in parallel by a graphics processing kernel launched on the graphics processing unit to process the grouped regions; and
  means for rendering pixels corresponding to the grouped regions by parallel threads of the graphics processing unit, the threads executing instructions defined by the graphics processing kernel.

24. A non-transitory computer readable medium having a computer program stored thereon for rendering an image using a graphics processing unit, the program comprising:
  code for receiving a plurality of regions, each region being associated with a stack of colour generation operations, stacks of colour generation operations for the plurality of regions being stored in a stack store;
  code for determining at least two equivalent stacks of colour generation operations in the stack store, wherein the at least two stacks are equivalent if the at least two stacks are defined by equivalent sets of graphical commands applied to different colour data;
  code for grouping regions associated with the determined at least two equivalent stacks of colour generation operations to be rendered in parallel by a graphics processing kernel launched on the graphics processing unit to process the grouped regions; and
  code for rendering pixels corresponding to the grouped regions by parallel threads of the graphics processing unit, the threads executing instructions defined by the graphics processing kernel.

25. A method of rendering an image, the method comprising:
  receiving a plurality of fill compositing stacks, each fill compositing stack being associated with at least one region of the image and comprising a plurality of levels to be composited to determine colour data of the at least one associated region;
  for a first fill compositing stack in the plurality of fill compositing stacks, determining a second compositing stack from the plurality of compositing stacks equivalent to the first fill compositing stack such that each level of the second fill compositing stack is equivalent to a corresponding level of the first fill compositing stack, wherein two equivalent levels are associated with different colour operands and invoke equivalent graphical commands;
  selecting regions associated with the first fill compositing stack and the second fill compositing stack; and
  rendering pixels of the selected regions concurrently to render the image.

* * * * *